United States Patent
Yarus et al.

(10) Patent No.: US 11,906,696 B2
(45) Date of Patent: Feb. 20, 2024

(54) POINT-VECTOR BASED MODELING OF PETROLEUM RESERVOIR PROPERTIES FOR A GRIDLESS RESERVOIR SIMULATION MODEL

(71) Applicant: Landmark Graphics Corporation, Houston, TX (US)

(72) Inventors: Jeffrey Marc Yarus, Houston, TX (US); Rae Mohan Srivastava, Toronto (CA); Yevgeniy Zagayevskiy, Didcot (GB); Jin Fei, Houston, TX (US); Yogendra Narayan Pandey, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 733 days.

(21) Appl. No.: 16/325,697

(22) PCT Filed: Sep. 1, 2017

(86) PCT No.: PCT/US2017/049797
§ 371 (c)(1),
(2) Date: Feb. 14, 2019

(87) PCT Pub. No.: WO2018/045255
PCT Pub. Date: Mar. 8, 2018

(65) Prior Publication Data
US 2021/0333433 A1    Oct. 28, 2021

Related U.S. Application Data

(60) Provisional application No. 62/383,311, filed on Sep. 2, 2016.

(51) Int. Cl.
*G01V 1/40*    (2006.01)
*G01V 99/00*    (2009.01)
(Continued)

(52) U.S. Cl.
CPC ............. *G01V 99/005* (2013.01); *G01V 1/40* (2013.01); *G06T 3/4053* (2013.01); *G06T 11/003* (2013.01)

(58) Field of Classification Search
CPC ...... G01V 99/005; G01V 1/40; G06T 11/003; G06T 3/4053
See application file for complete search history.

(56) References Cited

U.S. PATENT DOCUMENTS 8,274,859 B2 * 9/2012 Maucec ................. G06T 17/00
367/43
2007/0219724 A1   9/2007 Li et al.
(Continued)

FOREIGN PATENT DOCUMENTS

CN         103699751 A  *  4/2014
WO   WO-2015023265 A1  *  2/2015  ............. G01V 11/00

OTHER PUBLICATIONS

Hassler, G. L., and E. Brunner. "Measurement of capillary pressures in small core samples." Transactions of the AIME 160, No. 01 ( 1945): 114-123. (Year: 1945).*
(Continued)

*Primary Examiner* — Rehana Perveen
*Assistant Examiner* — Daniel E Miller
(74) *Attorney, Agent, or Firm* — DeLizio, Peacock, Lewin & Guerra, LLP

(57) ABSTRACT

Systems and methods for modeling petroleum reservoir properties using a gridless reservoir simulation model are provided. Data relating to geological properties of a reservoir formation is analyzed. A tiered hierarchy of geological elements within the reservoir formation is generated at different geological scales, based on the analysis. The geological elements at each of the different geological scales in the tiered hierarchy are categorized. Spatial boundaries between the categorized geological elements are defined for
(Continued)

□ Category 1
△ Category 2
● Control Points each of the geological scales in the tiered hierarchy. A scalable and updateable gridless model of the reservoir formation is generated, based on the spatial boundaries defined for at least one of the geological scales in the tiered hierarchy.

20 Claims, 29 Drawing Sheets

(51) Int. Cl.
*G06T 3/40* (2006.01)
*G06T 11/00* (2006.01)

(56) References Cited

U.S. PATENT DOCUMENTS

| | | | |
|---|---|---|---|
| 2009/0084545 | A1 | 4/2009 | Banerjee et al. |
| 2011/0054857 | A1* | 3/2011 | Moguchaya ........... G01V 99/00 703/2 |
| 2013/0332125 | A1* | 12/2013 | Suter ...................... G01V 99/00 703/6 |
| 2014/0288900 | A1 | 9/2014 | Preux et al. |
| 2015/0260016 | A1 | 9/2015 | Fung et al. |
| 2016/0168959 | A1 | 6/2016 | Yarus et al. |
| 2018/0016876 | A1 | 1/2018 | Lynch et al. |
| 2019/0227087 | A1* | 7/2019 | Belani ................... G01N 33/241 |

OTHER PUBLICATIONS

Yupeng, Li, and Wu Shenghe. "Hierarchical nested simulation approach in reservoir architecture modeling." (ScienceDirect, 2013) Petroleum Exploration and Development 40, No. 5: 676-681. (Year: 2013).*
Deutsch, Clayton V., and Libing Wang. "Hierarchical object-based stochastic modeling of fluvial reservoirs." (International Association for Mathematical Geology, 1996) Mathematical geology 28, No. 7: 857-880. (Year: 1996).*
Miall, Andrew D. "Facies architecture in clastic sedimentary basins." (Springer, New York, NY, 1988) In: Kleinspehn, K.L., Paola, C. (eds) New Perspectives in Basin Analysis. Frontiers in Sedimentary Geology. pp. 67-81. https://doi.org/10.1007/978-1-4612-3788-4_4 (Year: 1988).*
Hassanpour, Rahman Mohammad. Grid-free facies modelling of inclined heterolithic strata in the McMurray formation. Dissertation. University of Alberta (Canada), 2013. (Year: 2013).*
Yupeng, Li, Wu Shenghe, and Geng Lihui. "Spatial-vector-based reservoir architecture modeling of point-bar sand." (College Of Geosciences, China University Of Petroleum, 2013) Acta Petrolei Sinica 34, No. 1: 133-139. (Translation by USPTO attached) (Year: 2013).*
Georgsen, Frode, Anne Randi Syversveen, Ragnar Hauge, Jan Inge Tollefsrud, and Morten Fismen. "Local update of object-based geomodels." (OnePetro, 2009) SPE Reservoir Evaluation & Engineering 12, No. 03: 446-454. (Year: 2009).*
Breitfelder, Kim, and Don Messina. "IEEE 100: the authoritative dictionary of IEEE standards terms." Standards Information Network IEEE Press. v879 (2000), see "raster graphics" [p. 919]; and see "vector graphics", [p. 1249] (Year: 2000).*
Colombera, Luca, Fabrizio Felletti, Nigel P. Mountney, and William D. McCaffrey. "A database approach for constraining stochastic simulations of the sedimentary heterogeneity of fluvial reservoirs." AAPG Bulletin 96, No. 11 (2012): 2143-2166. (Year: 2012).*
Mauec, Marko, Jeffrey M. Yarus, Genbao Shi, and Richard L. Chambers. "Grid-less Modeling of Reservoir Properties with Maximum Continuity Field Interpolation." Ninth International Geostatistics Congress, Oslo, Norway Jun. 11-15, 2012 (Year: 2012).*
Search Report and Written Opinion issued for French Patent Application No. 1757783, dated Nov. 20, 2019, 7 pages.
Tuan, "Overview of Three-Dimensional GIS Data Models," *International Journal of Future Computer and Communication*, vol. 2, No. 3, Jun. 3, 2013, pp. 270-274.
Vector Data Models, https://saylordotorg.github.io/text_essentials-of-geographic-information-systems/s08-02-vector-data-models.html.
Zhu et al., "Coupled Modeling Between Geological Structure Fields and Property Parameter Fields in 3D Engineering Geological Space," *Engineering Geology*, vol. 167, Dec. 14, 2013, pp. 105-116.
Korean Intellecutal Property Office, International Search Report and Written Opinion, PCT/US2017/049797, dated Dec. 11, 2017, 17 pages, Korea.
R. Mohan Srivastava, Peter Frykman and Mark Jensen, Geostatistical Stimulation of Fracture Networks, 2005, 10 pages, O. Leuangthong and C. V. Deutsch (eds.), Geostatistics Banff 2004, Springer, Netherlands.
Marko Maucec Jeffrey M. Yarus, Genbao Shi and Richard L. Chambers, Grid-less Modeling of Reservoir Properties with Maximum Continuity Field Interpolation, Jun. 11-15, 2012, 15 pages, Ninth International Geostatistics Congress, Oslo, Norway.
R. Mohan Srivastava, Gridless Simulation of Facies Architecture in a Carbonate Environment, Sep. 22-24, 2014, 1 page, Gussow Geosciences Conference, Banff, Canada.
R. Mohan Srivastava, Marko Maucec, Kuala Lumpur and Jeffrey Yarus, Grid-less Simulation of a Fluvio-Deltaic Environment, 2013, 8 pages, Integration geoConvention, Geoscience Engineering Partnership.
Yevgeniy Zagayevskiy and Clayton V. Deutsch, Multivariate Geostatistical Grid-Free Simulation of Natural Phenomena, Mar. 20, 2015, 29 pages, Mathematical Geosciences.p.

* cited by examiner

○ Category 1
△ Category 2
● Control Points

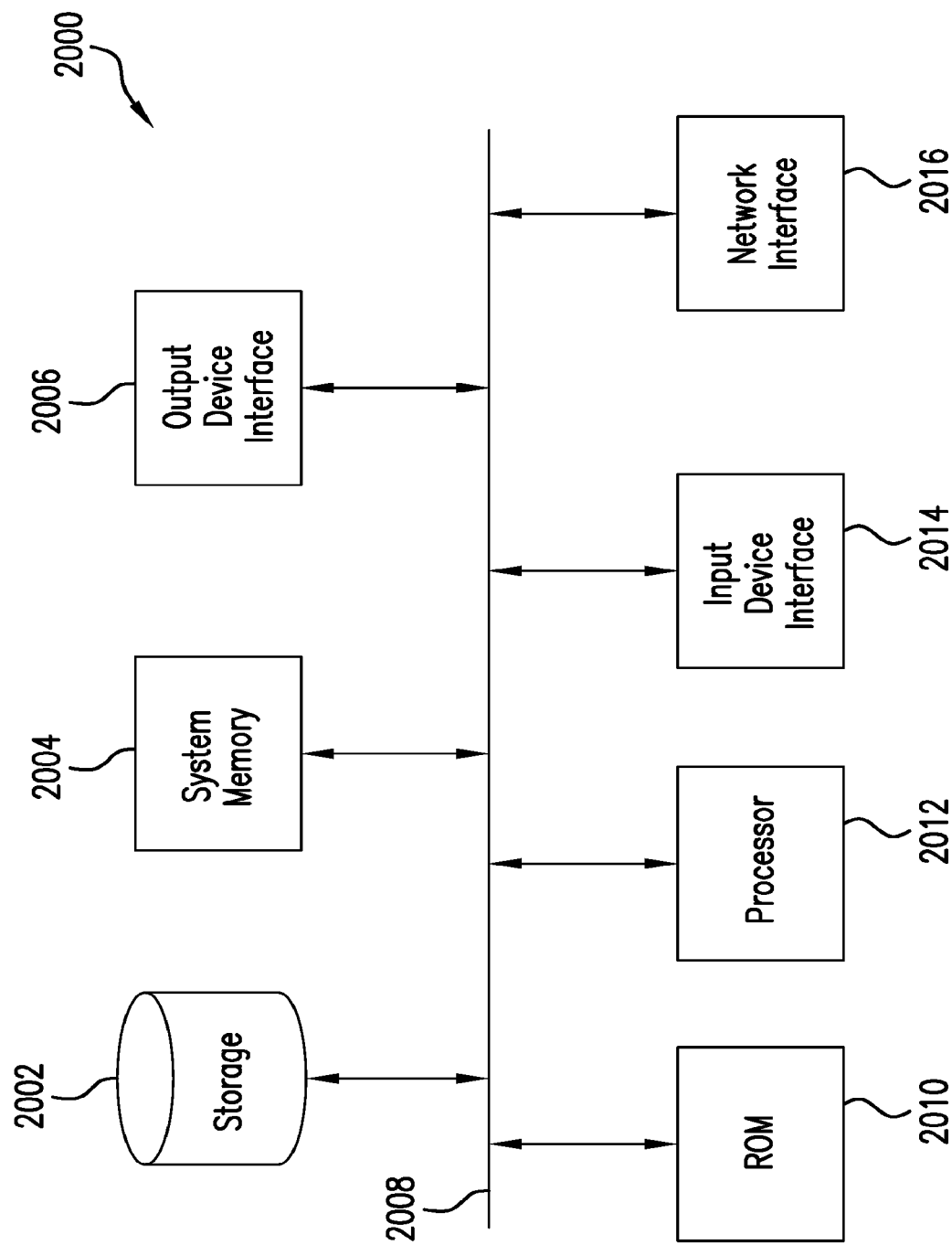

US 11,906,696 B2

POINT-VECTOR BASED MODELING OF PETROLEUM RESERVOIR PROPERTIES FOR A GRIDLESS RESERVOIR SIMULATION MODEL

CROSS-REFERENCE TO RELATED APPLICATIONS

The present application is a U.S. national stage patent application of International Patent Application No. PCT/US2017/049797, filed on Sep. 1, 2017, which claims priority to U.S. Provisional Application No. 62/383,311, filed on Sep. 2, 2016, the benefit of each of which is claimed and the disclosure of each of which is incorporated herein by reference in its entirety.

TECHNICAL FIELD

The present description relates to reservoir simulation modeling, and particularly, to geostatistical modeling and simulation of petroleum reservoir properties.

BACKGROUND

In the oil and gas industry, geostatistical modeling techniques have been used to generate computer models of subsurface reservoir formations within a hydrocarbon producing field for purposes of estimating petroleum reserves and making decisions regarding the development of the field. Such a model may provide, for example, a static description of geological properties of a petroleum reservoir within a subsurface formation prior to drilling and production. Traditional models of petroleum reservoir properties generally require a grid of cells or blocks for which geological properties are defined or predicted. However, the grid of cells for a model imposes constraints on regridding and refinement of current models and updating the model with new data. Geological scalability of the model is another concern with conventional geostatistical techniques.

BRIEF DESCRIPTION OF THE DRAWINGS

The present disclosure is best understood from the following detailed description when read with the accompanying figures.

FIG. 20 is a block diagram illustrating an example of a computer system in which embodiments of the present disclosure may be implemented.

DETAILED DESCRIPTION

Figure 1A:
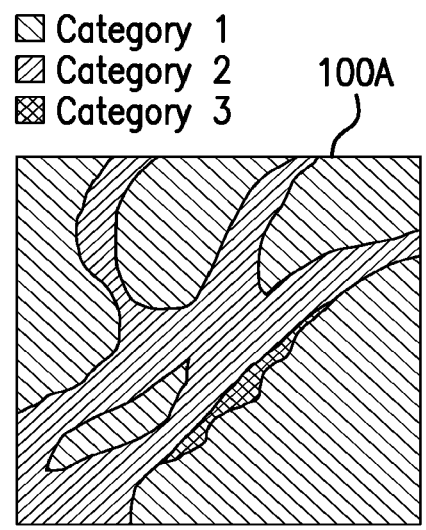
FIGS. 1A-1B are diagrams illustrating examples of a gridless model and a gridded model, respectively.

Embodiments of the present disclosure relate to modeling geological properties of a petroleum reservoir using a gridless reservoir simulation model. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within 1.0 the knowledge of one skilled in the art to effect such feature, structure, or characteristic in connection with other embodiments whether or not explicitly described.

Embodiments of the present disclosure relate to geomodeling techniques for simulating geological properties of a petroleum reservoir in a gridless manner. As will be described in further detail below, such techniques may be used to generate updatable and scalable geological models without the model regridding and refinement constraints that are typically associated with conventional geocellular models. In one or more embodiments, a gridless model representing the geological properties of the reservoir may be generated using vector graphics, rather than rasterized pixels as in conventional geomodeling and geostatistical techniques. For example, the reservoir's properties may be represented in a vector graphics format that allows the gridless model to provide strict contact boundaries between different categorical variables (e.g., lithological facies) as well as strict contour lines for continuous variables (e.g. porosity or permeability) or geological elements (e.g. fluvial channels). The gridless model in this example may be a two-dimensional (2D) model in which the contact boundaries and geological elements are represented in 2D space, e.g., as a set of connected vectors or 2D splines. Alternatively, the gridless model may be a three-dimensional (3D) model in which the boundaries and geological elements are represented in 3D space, e.g., as 3D spline surfaces.

The disclosed gridless modeling techniques for generating such vector-based models are also referred to herein as "point-vector" (or "PV") techniques. Also, the models generated using the disclosed techniques may be referred to herein as point-vector or PV models. Therefore, it should be appreciated that the terms "gridless" and "point-vector" are used interchangeably herein to refer to the disclosed geomodeling techniques as well as the 2D or 3D models that are generated in vector graphics format using these techniques. Advantages of such a PV model relative to geological models generated using conventional geostatistical techniques include, but are not limited to, being infinitely resolvable, resolution independent, and geologically scalable. Also, the disclosed techniques may allow such a model to be generated in a stochastic manner while ensuring that the underlying data being represented by the model is still honored for different geological scales and resolutions, as will be described in further detail below.

Illustrative embodiments and related methodologies of the present disclosure are described below in reference to FIGS. 1-20 as they might be employed, for example, in a computer system for planning and control of wellsite operations. For example, the disclosed techniques may be employed in such a computer system to generate a PV model of a reservoir rock formation's geological properties and use the generated model to estimate the petroleum reserves of the formation or to simulate propagation of induced fractures in a fracking process of the reservoir rock. Another application of the generated PV model is to simulate the flow of fluids (e.g., oil and/or water) within the reservoir formation presented by this PV model. The results of the simulation may then be used to perform various wellsite operations including, for example and without limitation, well placement, production planning, and/or stimulation planning purposes. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1B:
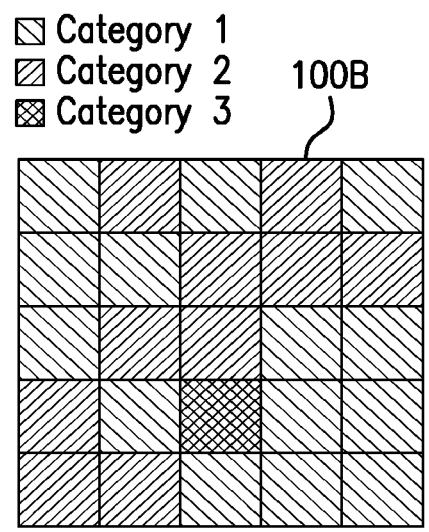

FIGS. 1A and 1B are diagrams of an illustrative gridless model 100A and an illustrative gridded model 100B, respectively. Each of the models shown in FIGS. 1A and 1B may be, for example, a 2D geological model representing different categories of geological properties for a subsurface volume of a reservoir rock formation. However, it is assumed for purposes of this example that gridless model 1001 of FIG. 1A was generated using the PV techniques disclosed herein while gridded model 100B was generated using conventional geocellular modeling techniques. Such conventional modeling techniques typically utilize a grid having a regular spatial arrangement of cells, e.g., corresponding to different points in a 2D coordinate space, where each cell may be assigned geological properties of a corresponding portion of the reservoir formation based on its relative spatial position within the grid. However, as the grid of cells and values assigned to each cells of gridded model 100B typically impose various constraints on the resolution and scalability of the model.

By contrast, gridless model 100A generated using the PV techniques disclosed herein may be used to represent the reservoir formation's rock and fluid properties without a predetermined grid or the resolution and scalability constraints associated with gridded model 100B. Also, as described above, the PV techniques disclosed herein enable geological properties to be represented in a vector graphics format rather than with rasterized pixels, as in gridded models generated using conventional geostatistical modeling techniques. This allows gridless models, e.g., gridless model 100A, generated using the disclosed techniques to represent a reservoir's geological properties in a resolution-independent way, as will be described below with respect to the example shown in FIGS. 2A, 2B, and 2C.

Figure 2A:
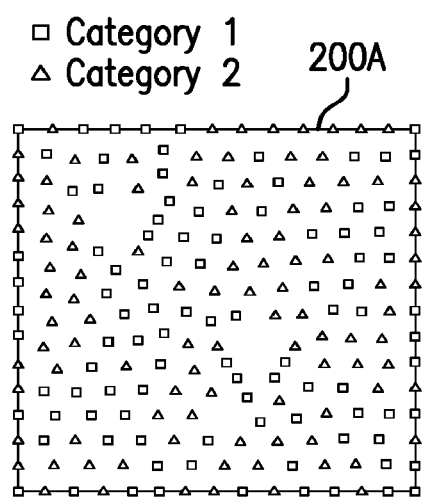
FIG. 2A is a diagram of an illustrative conditioning data set that may be used to generate geological models of reservoir properties with gridless and gridded modeling techniques.
Figure 2B:
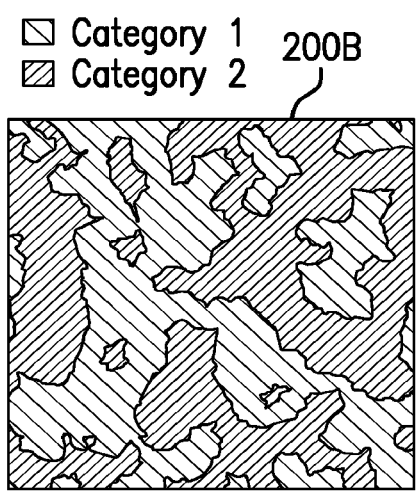
FIGS. 2B-C are diagrams of illustrative gridless and gridded models generated from the conditioning data set of FIG. 2A.
Figure 2C:
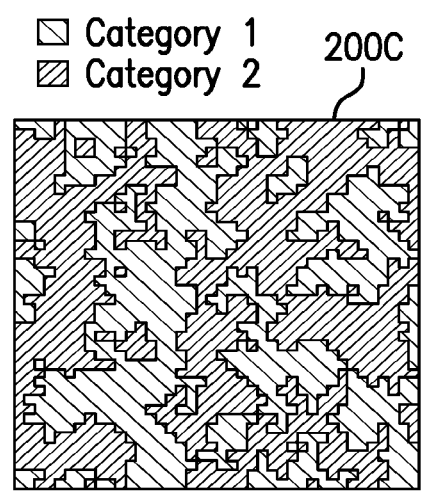

FIG. 2A is a diagram of an illustrative conditioning data set 200A for different categories of geological properties. Conditioning data set 200A may be applied to a gridless or gridded model according to a given graphical resolution of interest. FIGS. 2B-C are diagrams illustrating a graphical resolution of a gridless model 200B and a gridded model 200C, respectively, based on the conditioning data set of FIG. 2A. A comparison between the different resolutions of the models as shown in FIGS. 2B and 2C indicates that while gridless model 200B of FIG. 2B has continuous boundaries between categories, gridded model 200C of FIG. 2C has a rasterized modeling domain in which the categories are defined for individual cells on a pixel-by-pixel (or cell-by-cell) basis. Thus, the gridless modeling techniques disclosed herein allow gridless models, e.g., gridless model 200B, to provide a more accurate or realistic representation of modeled petroleum reservoir properties.

As described above, the reservoir's properties may be represented in a vector graphics format that allows the gridless model to provide strict contact boundaries between different categorical variables (e.g., lithological facies) as well as strict contour lines for continuous variables (e.g. porosity or permeability) or geological elements (e.g. fluvial channels). In one or more embodiments, the disclosed PV techniques may be used to construct contact boundaries between categories or contour lines of continuous variables for either 2D or 3D models with only slight variations. In one or more embodiments, contact boundaries between different categories may be constructed as polylines in 2D space or as meshed surfaces in 3D space that would form objects of distinct categories.

In 2D space, the disclosed PV techniques may be used to simulate connected vectors of approximately equal magnitude that represent the boundaries between different classes of properties of natural phenomena (e.g., categories, intervals of continuous properties, etc.) or the different classes themselves (e.g., river channels, fractures, faults, etc.). Such vectors may form polylines that follow the path determined by the data distribution. The triangulation of the data may be required to establish this path. The polyline formed by simulated vectors can be replaced with spline curves (e.g. Hermite splines). In 3D space, spline surfaces may be simulated as part of the disclosed PV techniques for purposes of drawing the boundaries between categories. Thus, the disclosed PV techniques may be used to build geological surfaces, structural elements, lithological facies, and continuous properties of the petroleum reservoirs in a grid-free manner. The surface boundaries in 3D space are generated with spline surfaces. Such techniques may also be used to generate multiple realizations as needed or desired for a particular implementation.

Figure 3:
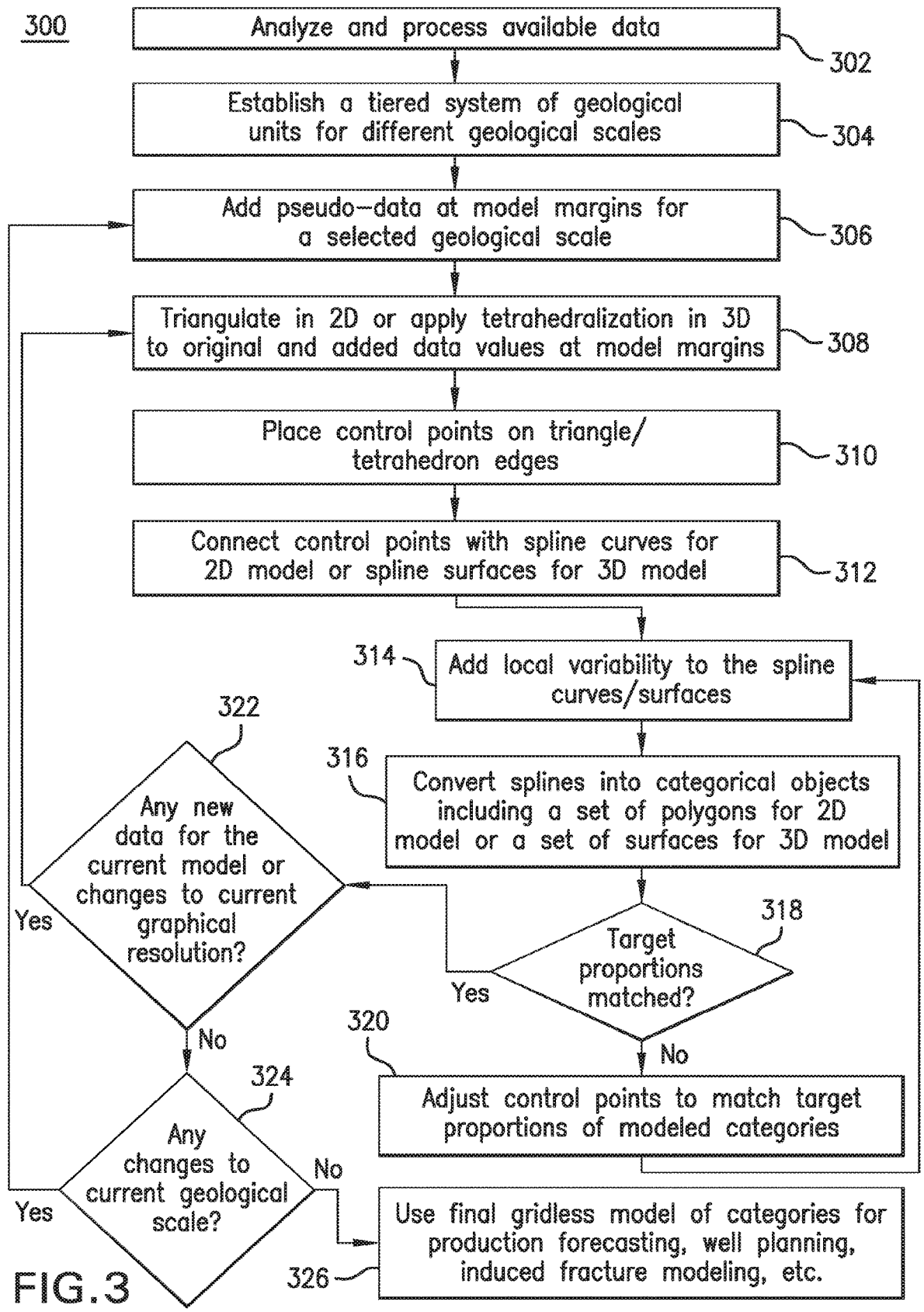
FIG. 3 is a flow diagram of an illustrative process of simulating geological properties of a petroleum reservoir using a gridless vector-based or point-vector (PV) model.

FIG. 3 is a flow diagram of an illustrative process 300 of generating a gridless or PV model for simulating geological properties of a petroleum reservoir. The PV model generated in this example may be either a 2D model or a 3D model. Accordingly, process 300 will be described with respect to operations for both 2D and 3D models. As shown in FIG. 3, process 300 begins in block 302, in which data from various sources is analyzed and processed. Examples of such data sources include, but are not limited to, core samples, well log data, seismic data, and geological interpretations.

Figure 9:
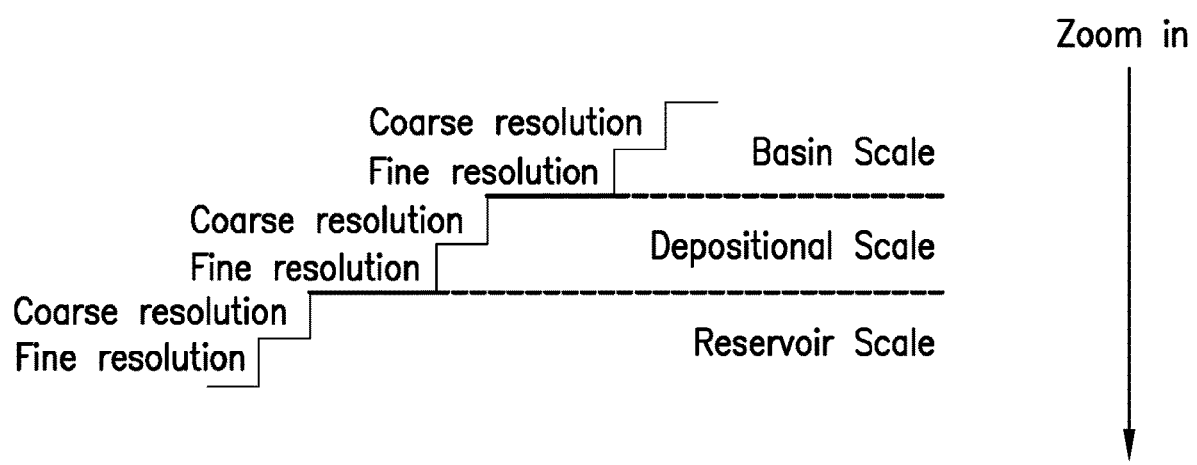
FIG. 9 is a diagram of illustrative graphical resolutions for different geological scales at varying levels of zoom.

In block 304, a tiered system or hierarchy of geological units (e.g., lithological facies) is established for various geological scales. The different geological scales may include, for example and without limitation, a basin scale, a depositional scale, and a reservoir scale. An example of such a tiered hierarchy is shown in FIG. 9, which will be described in further detail below. In one or more embodiments, the different geological scales and geological units within each scale in the tiered hierarchy for a gridless model may be associated with a plurality of graphical resolutions at different zoom levels. The plurality of graphical resolutions may include, for example, a coarse resolution and a fine resolution as well as a range of resolutions that vary between the coarse and fine resolutions. The geological scale of each geological unit in the tiered hierarchy also may vary between a range of coarse and fine scales. A geological unit of relatively coarse scale in the tiered system may include, for example, one or several geological units of relatively finer scale. Thus, block 304 may also include defining a relationship between geological units within each scale. In some implementations, block 304 may further include selecting data for conditioning the model given a particular graphical scale of interest.

In block 306, pseudo-data are added at locations corresponding to the domain margins of the PV model being generated. The pseudo-data may be added to fill in any gaps between the domain boundaries and adjacent data values. Additional pseudo-data are added at model's corner points. In cases where spatial continuity of the modeled system is less than data density, the pseudo-data may also be added between the original data locations. In one or more embodiments, block 306 may include simulating values for the added pseudo-data based on an initial set of conditioning data and the spatial distribution of the data, Multiple realizations of the pseudo-data may also be generated in block 306.

Process 300 then proceeds to block 308, which includes triangulating data points in 2D space or applying tetrahedralization to points in 3D space corresponding to the original and added data values at the modeling domain margins.

In block 310, control points may be placed on the edges of the triangles/tetrahedrons formed by the triangulation/tetrahedralization performed in block 308. The control points may be placed primarily on the edges that connect two different data types. The control points may be placed so as to preserve the spatial distribution of the reservoir system being modeled and any anisotropy that may be present within the modeled categories or domains. By implementing triangulation/tetrahedralization in various ways and placing control points on the edges of resulting triangles/tetrahedrons in different patterns, data reproduction may be ensured in the final PV model that is generated. In one or more embodiments, block 310 may also include generating multiple realizations as needed or desired for a particular implementation.

In block 312, the control points that were placed in step 310 are connected with spline curves for a 2D PV model or spline surfaces for 3D PV models. The control points are used as anchor points to derive connected vectors or splines of a selected discretization level. These polylines form contact boundaries between categories. The magnitude of the vectors or discretization level of the splines may represent, for example, a resolution of contact boundaries.

In block 314, local variability is added to the spline curves/surfaces in order to avoid over-smoothed contact boundaries. Multiple realizations may be generated this way, although their spatial connectivity would not differ much from each other. The control points may be adjusted in block 314 to ensure that no contact boundaries cross one another.

In block 316, splines are converted into categorical objects including a set of polygons for a 2D model or a set of surfaces for a 3D model.

In block 318, it is determined whether or not the simulated or modeled proportions of modeled categories based on the control points adjusted in block 314 above match target proportions, e.g., within a predetermined error tolerance. If it is determined in block 318 that the simulated/modeled proportions fail to match the target proportions, process 300 proceeds to block 320, where the control points may be further adjusted accordingly and process 300 returns to block 314. However, if it is determined in block 318 that the simulated/modeled proportions match the target proportions, process 300 proceeds to block 322.

In block 322, it is determined whether any new data needs to be incorporated into the current PV model or whether there are any changes to the current graphical resolution specified for the current model at this stage of the process. If it is determined in block 320 that either the graphical resolution has changed or the current PV model needs to be updated with new data (e.g., additional conditioning data for a visual representation of the PV model to be displayed or recently acquired conditioning data from a newly drilled well), process 300 returns to block 308 and the operations in blocks 308, 310, 312, 314, 316, 318, 320 (if necessary), and 322 are repeated. In one or more embodiments, the current model may be maintained so as to preserve the previous results of the triangulation/tetrahedralization and the operations in the blocks 308 through 322 are repeated with the new data. For example, new triangles/tetrahedrons may be introduced based on the triangulation/tetrahedralization of the new data at block 308 while keeping original triangles/tetrahedrons unchanged. However, if it is determined in block 322 that the graphical resolution has not changed and that no new data needs to be incorporated into the current PV mode, process 300 proceeds to block 324.

Block 324 includes determining whether or not the geological scale specified for the current PV model has changed. If it is determined in block 324 that the geological scale has changed, process 300 returns to block 306 and the operations in blocks 306, 308, 310, 312, 314, 316, 318, 320 (if necessary), 322, and 324 are repeated. The operations in these blocks may be repeated with different model categories at finer geological scales that are related to the relatively coarse scale of the previous model categories. Otherwise, process 300 proceeds to block 326, in which the current PV model is made final and used to simulate reservoir conditions for well planning and production operations.

Additional features and characteristics of the PV techniques disclosed herein will now be described in reference to the examples illustrated in FIGS. 4A-19. Although the examples in FIGS. 4A-16 will be described using 2D models, it should be appreciated that the disclosed PV techniques are not intended to be limited thereto and that these techniques may be applied to 3D models, as will be described with respect to FIGS. 17A-19. For discussion purposes and ease of explanation, it will be assumed that the PV models illustrated in FIGS. 4A-17F include only two categories of geological units or elements. In FIGS. 4A-7D and 17A-17F in particular, each element is shown as either a square-shaped or triangle-shaped data point within a 2D space depending on the category to which the particular element belongs. It should be appreciated that while different shapes are used to different the data points, regions, or other features of the geological categories represented in these figures, it should be appreciated that the disclosed embodiments are not limited thereto and that any of various visualization techniques may be used instead. For example, such categories may be illustrated using different patterns, colors or other type of visualization to differentiate the corresponding data points.

However, it should be noted that the disclosed PV techniques are not intended to be limited to only two categories and that these techniques may be applied to PV models including any number of categories of geological elements.

Figure 4A:
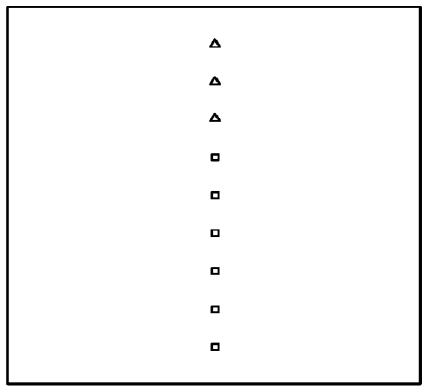
FIGS. 4A-I are different views of control points and splines within an illustrative two-dimensional (2D) vector space at various stages of a point-vector (PV) simulation procedure.
Figure 4B:
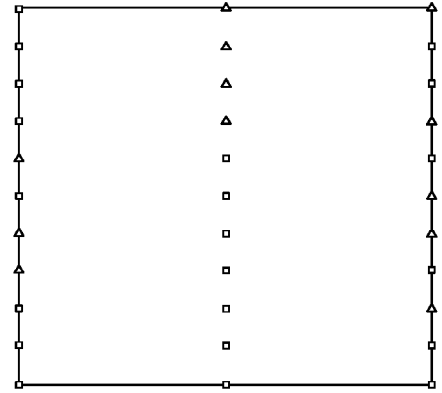
Figure 4C:
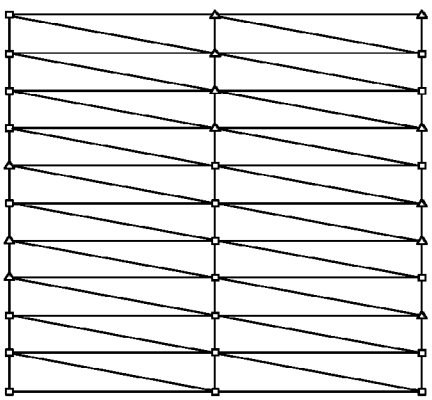
Figure 4D:
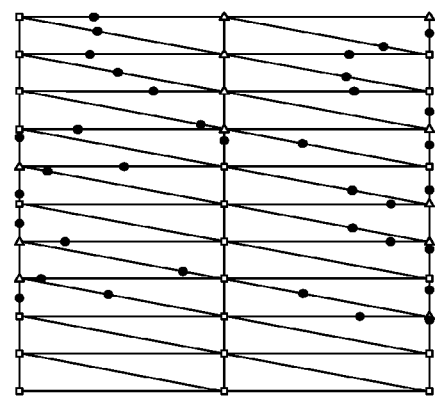
Figure 4E:
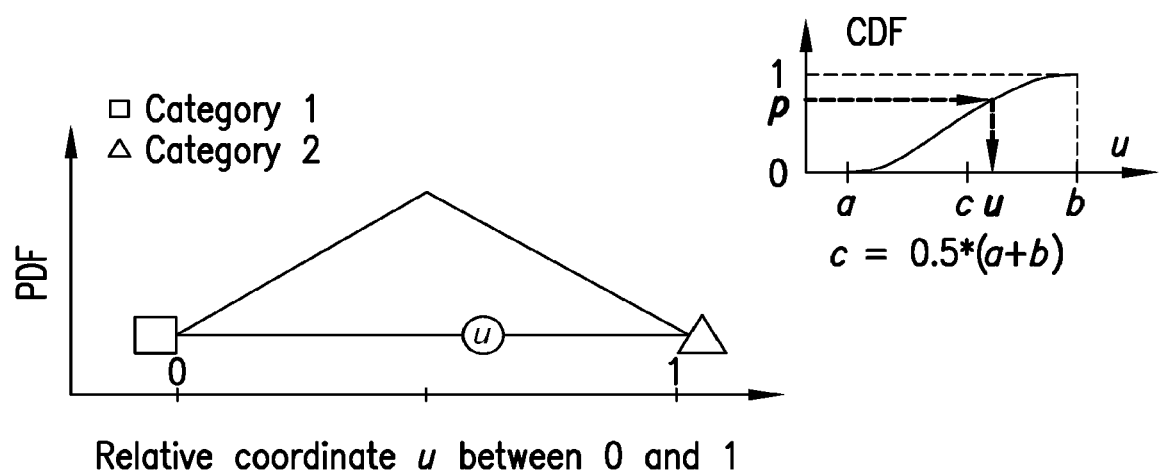
Figure 4F:
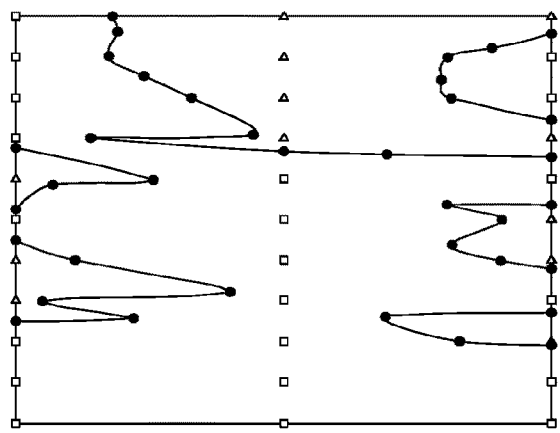
Figure 4G:
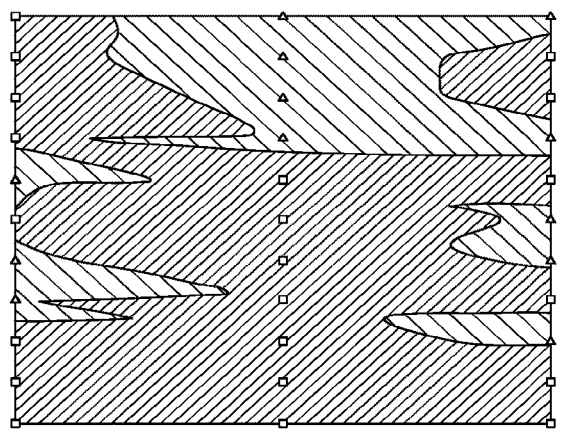
Figure 4H:
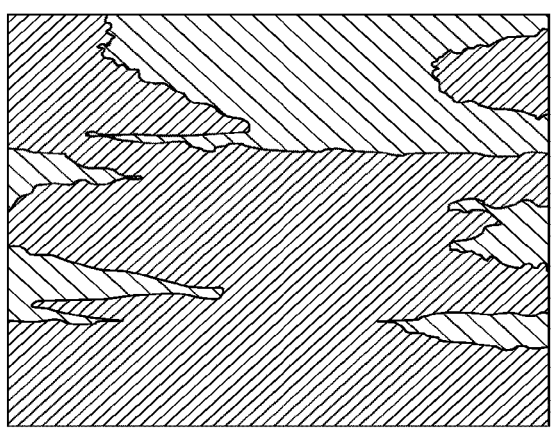
Figure 4I:
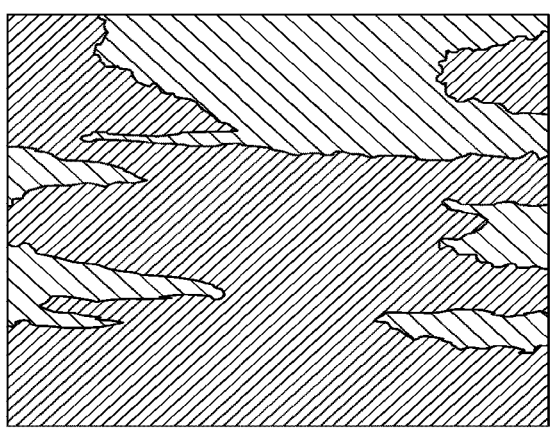

FIGS. 4A-I illustrate an application of the PV techniques for generating a gridless model with two categories of geological elements (square vs. triangle-shaped points). In FIG. 4A, the data for the model is defined. In FIG. 4B, the pseudo-data are added at the model margins and model corners. The values of pseudo-data are simulated conditional to original data and their spatial distribution. In FIG. 4C, triangulation is performed with all original and pseudo-data locations. In FIG. 4D, control points (circle-shaped points) are located on the triangle edges that connect two different categories. In FIG. 4E, the locations of control points can be randomly, drawn from the triangular distribution between two data locations of different categories. In FIG. 4F, the control points are connected with splines to define contact boundaries between categories. In FIG. 4G, the categorical objects are defined with splines. In FIG. 4H, the local variations are added to avoid excessive smoothness of the PV model. The variability may be added by, for example, perturbing splines at their discretization points. In FIG. 4I, the control points are adjusted to match target proportions of the categories. Proportions may be adjusted using an optimization algorithm, for example, with simulated annealing.

Figure 5A:
FIGS. 5A-D are different views of another 2D vector space illustrating how anisotropy is addressed by the PV simulation procedure of FIGS. 4A-1.
Figure 5B:
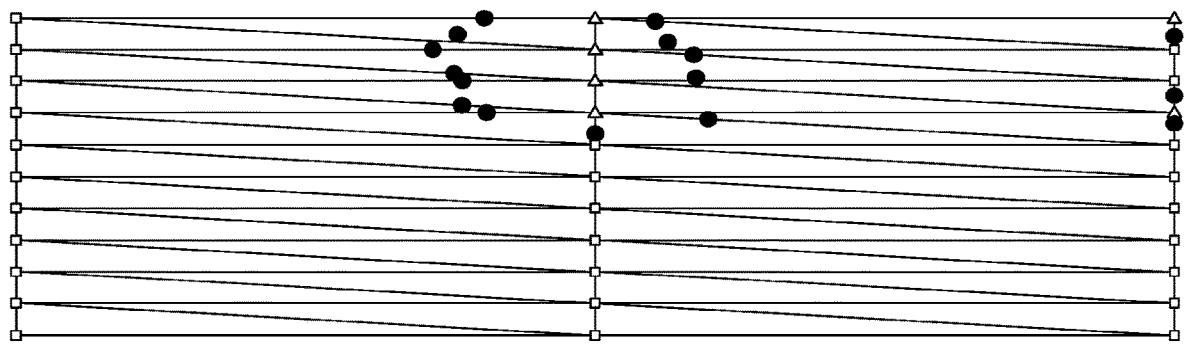
Figure 5C:
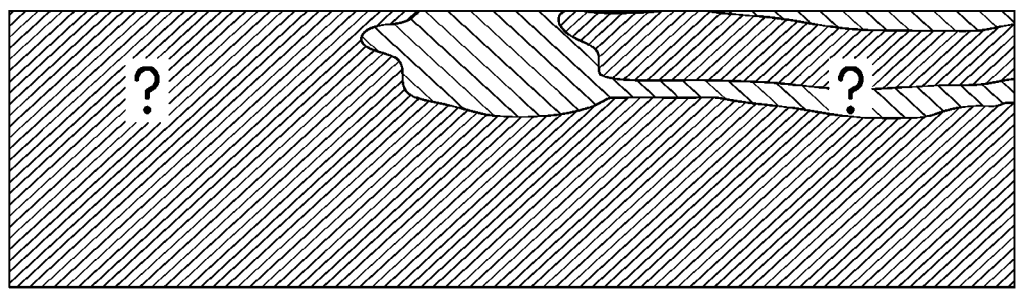
Figure 5D:
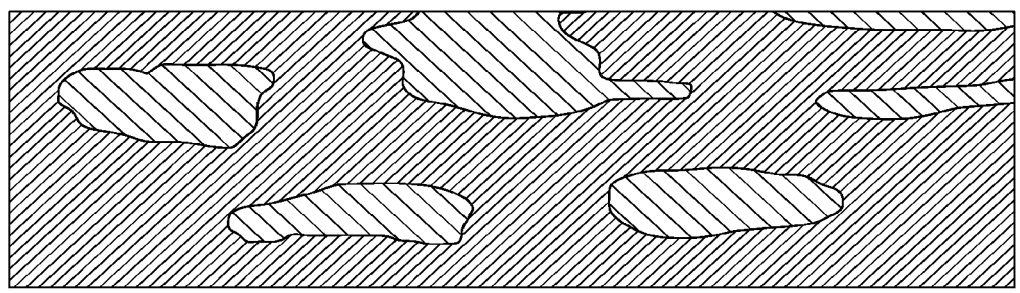

The examples shown in FIGS. 5A-D highlight how anisotropy is addressed by the PV simulation procedure of FIGS. When correlation range is shorter than length of the triangulation edge, several control points should be simulated per an edge. An anisotropy ellipse of the correlation structure of the modeled system is shown in FIG. 5A that leads to control points distributed around one of the categories of elements, e.g., as represented by the triangle-shaped data points shown in FIGS. 5B and 5C. As indicated by the question marks in FIG. 5C, the PV model may be more continuous in the horizontal direction than necessary or desired. Therefore, additional control points may be added per edge in order to create additional categorical objects or interrupt existing boundaries as shown in FIG. 5D.

FIGS. 6A-G are different views of yet another 2D vector space illustrating different stages of a procedure for updating a graphical resolution of a gridless PV model or incorporating newly acquired conditioning data into the model.

Figure 6A:
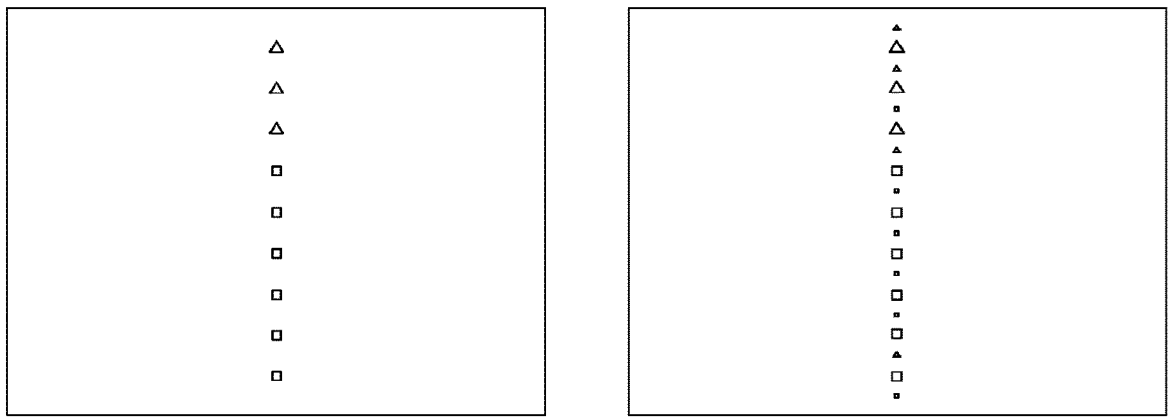
FIGS. 6A-G are different views of yet another 2D vector space illustrating different stages of a procedure for updating a graphical resolution of a gridless PV model or updating the gridless PV model with newly acquired conditioning data.
Figure 6B:
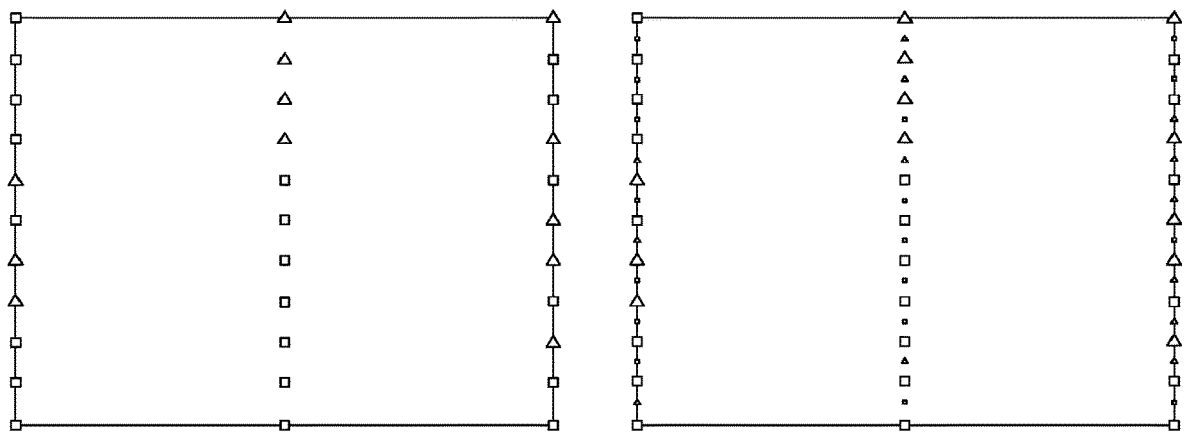
Figure 6C:
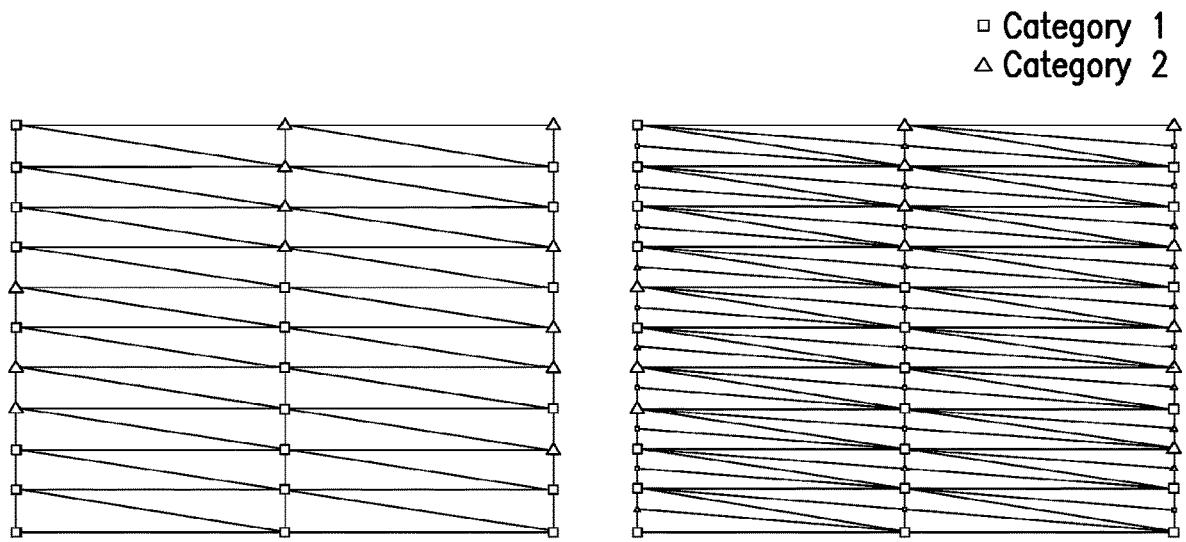
Figure 6D:
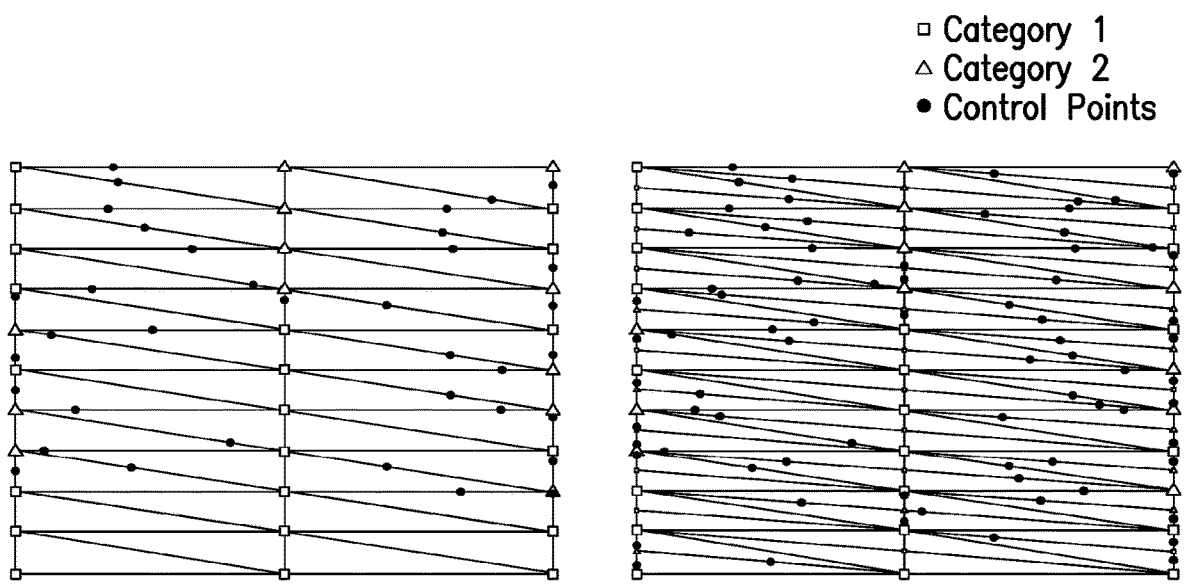
Figure 6E:
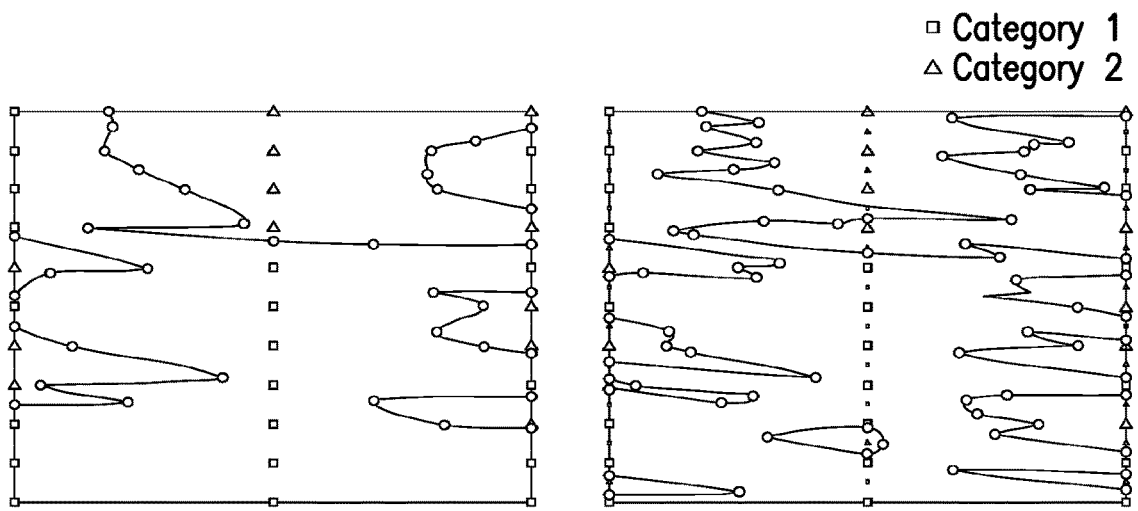
Figure 6F:
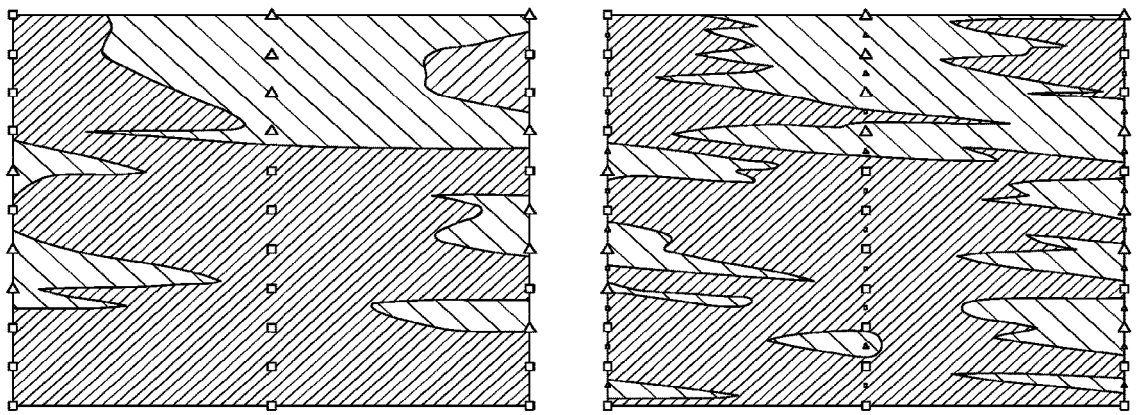
Figure 6G:
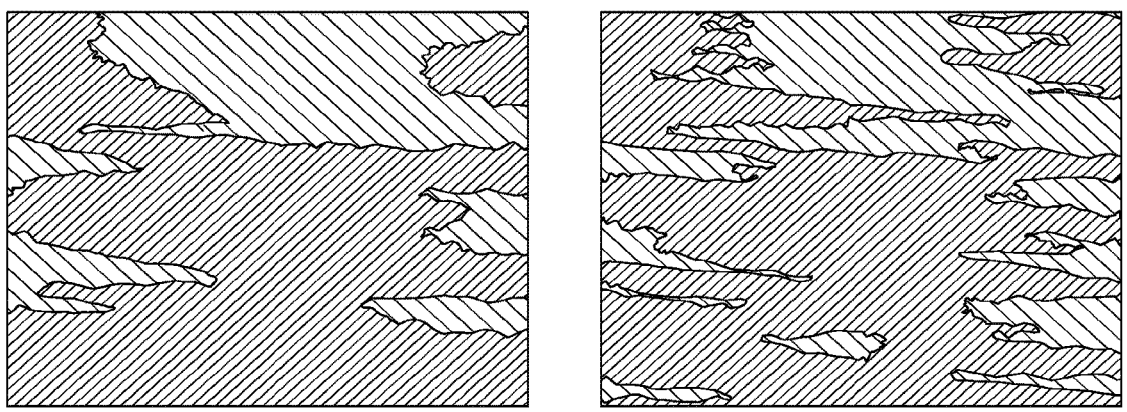

Examples of updating the model with new data and changing the model's graphical resolution using the disclosed PV techniques are shown in FIGS. 6A-G. In each of FIGS. 6A-G, the original or initial PV model is shown on the left-hand side and the updated model is shown on right-hand side. In FIG. 6A, data are defined. In FIG. 6B, marginal pseudo-data are simulated. Original pseudo-data are preserved in the updated model. In FIG. 6C, triangulation is performed. Triangulation in the updated model is performed after triangulation of the original data is carried out. In FIG. 6D, control points are placed. The location of original control points is preserved. In FIG. 6E, control points are connected by splines. In FIG. 6F, categorical objects are produced. In FIG. 6G, local variability is added.

Figure 7A:
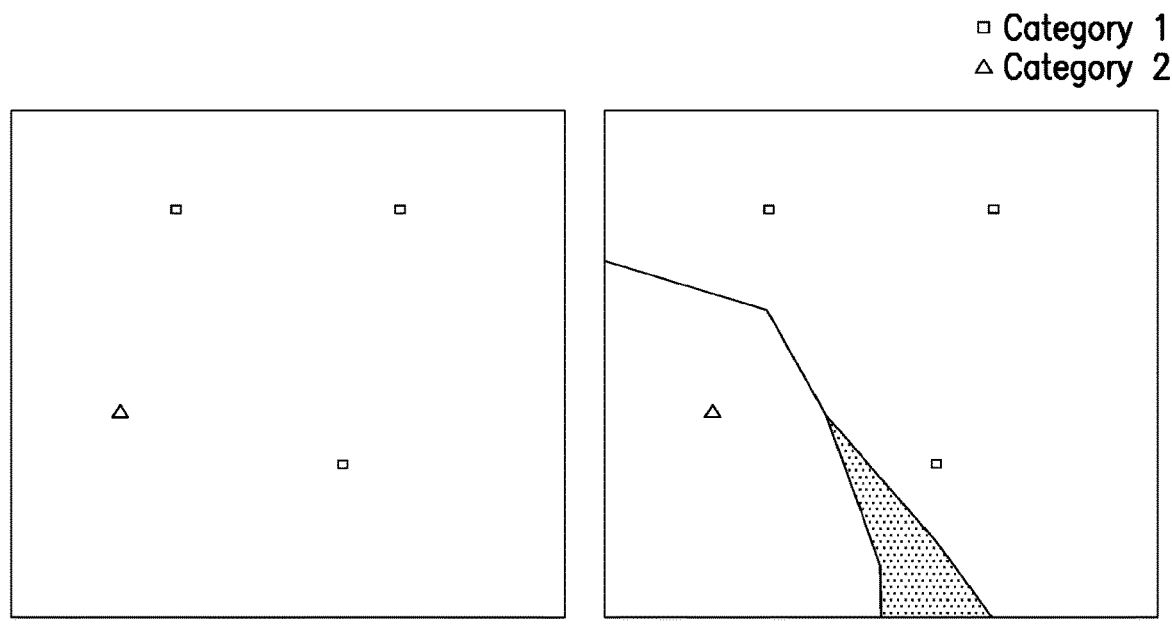
FIGS. 7A-D are different views of yet another 2D vector space illustrating a comparison between generating a PV model that incorporates only primary data and one that incorporates a combination of primary and secondary data.
Figure 7B:
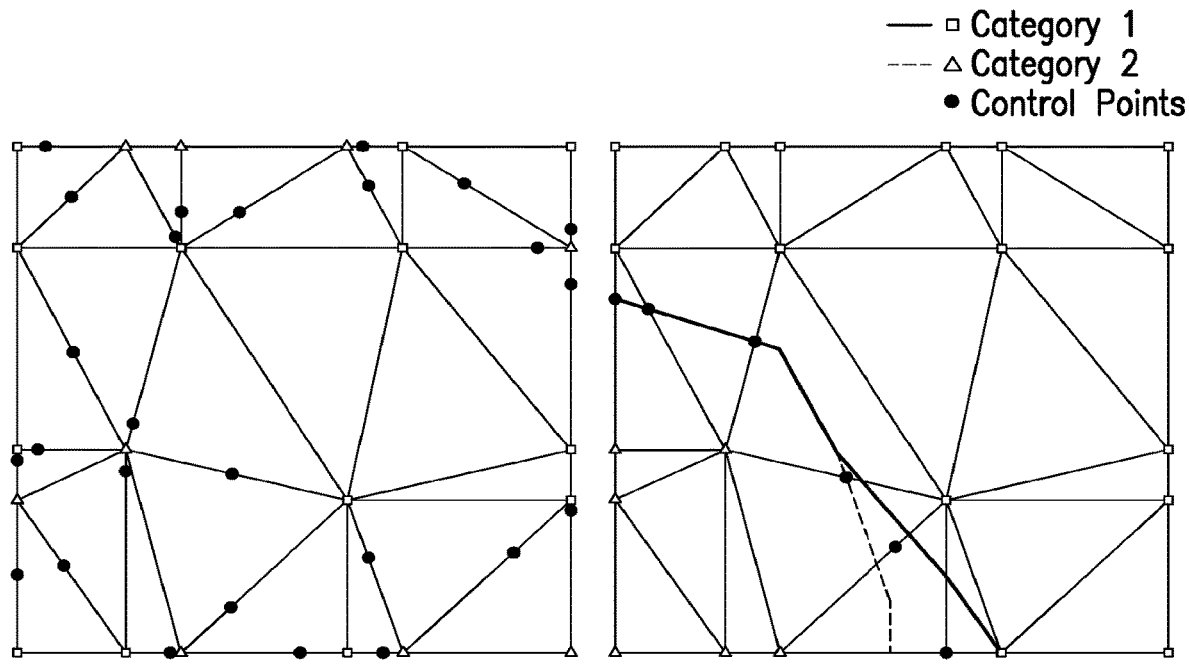
Figure 7C:
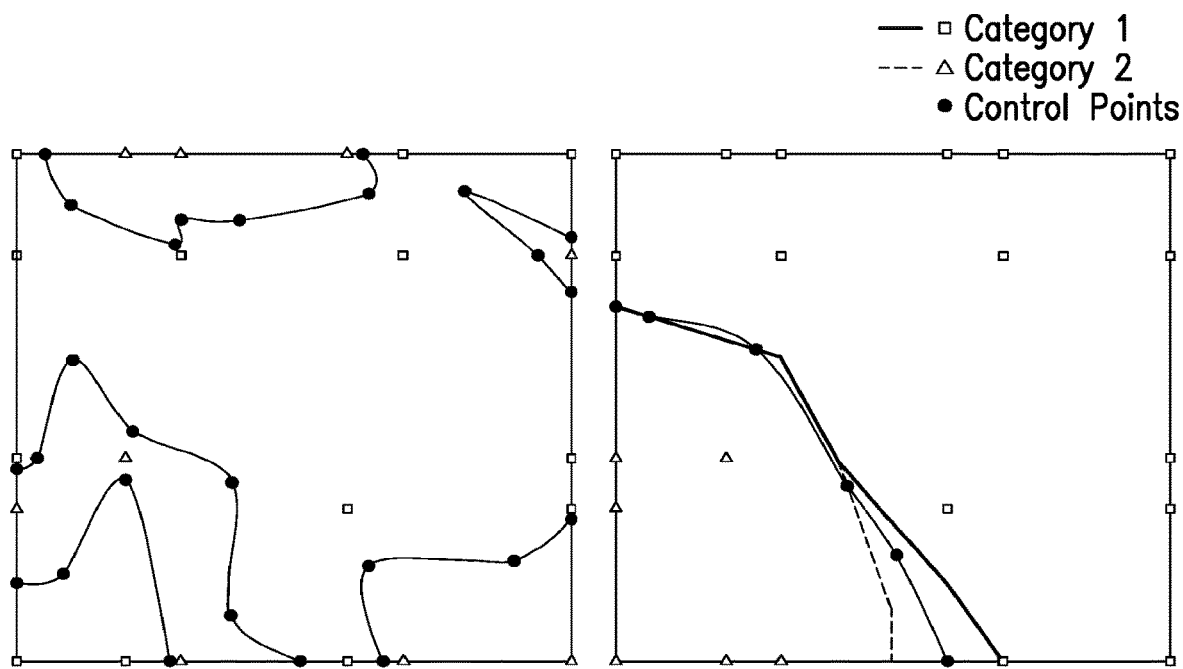
Figure 7D:
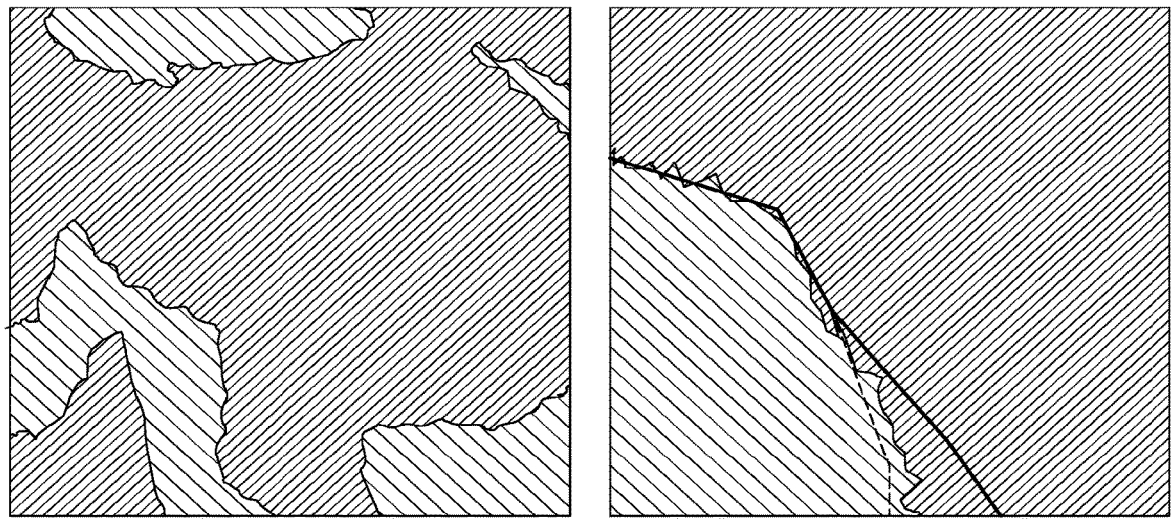

In one or more embodiments, secondary data may be used to additionally constrain where a contact boundary is drawn in the PV model. FIGS. 7A-D show a comparison between a first PV model (on the left hand side) that incorporates only primary data relative to a second PV model (on the right hand side) that incorporates both primary and secondary data types, where the secondary data is in the form of a regional map. In FIG. 7A, the primary and secondary data are shown. The secondary data in this example are represented by a contact boundary of various uncertainties between two categories. The contact boundary may be available with relatively little or no uncertainty in the upper part of the model. However, the uncertainty in the contact boundary may increase for locations further from the upper part of the model and closer to the lower part. In FIG. 7B, marginal data are introduced, and control points are located. In FIG. 7C, the splines are drawn. In FIG. 7I), the simulated objects of categories are obtained.

Figure 8:
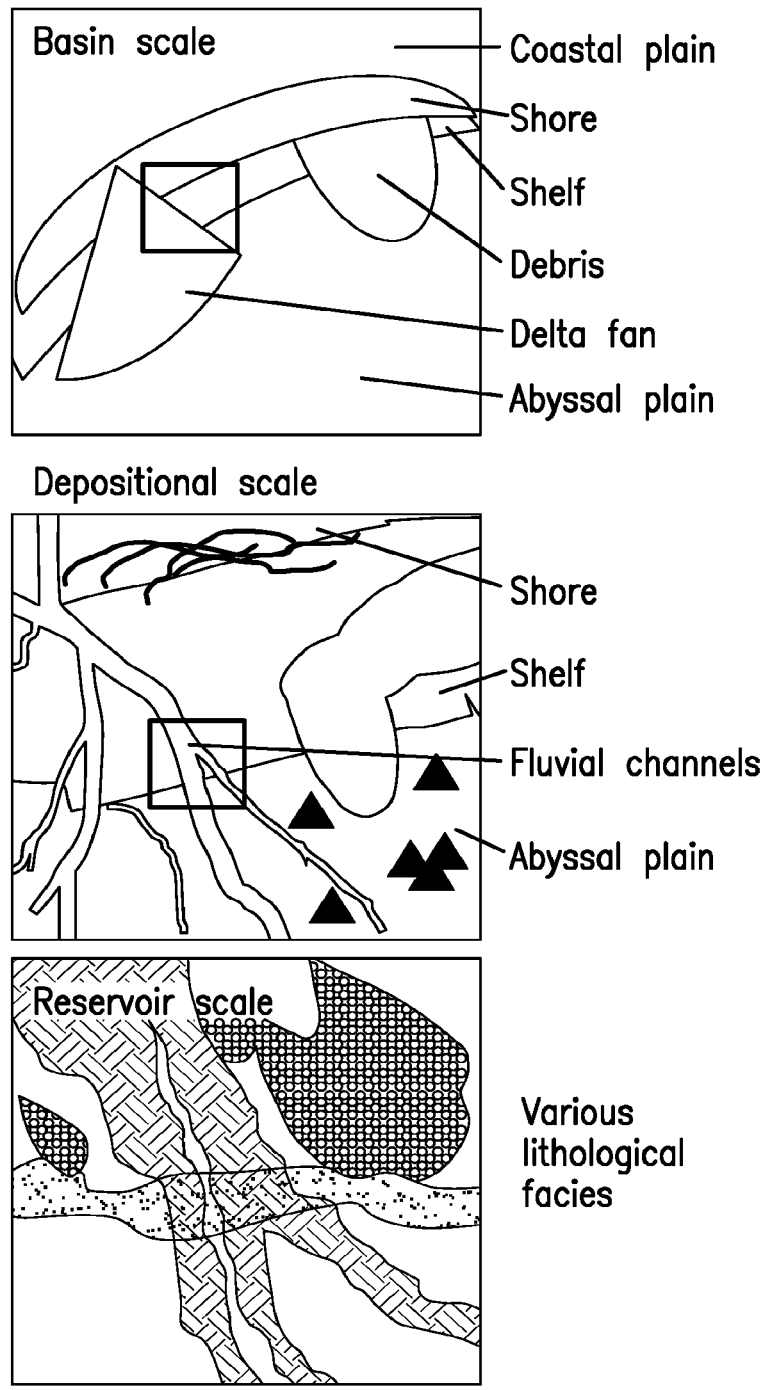
FIG. 8 is a diagram of illustrative geological units within a tiered system at varying scales and zoom levels.

The scalability of PV model is ensured by a tiered system of geological units. The underlying concept is shown in FIG. 8. In this example, coarse (basin), medium (depositional), and fine (reservoir) scales are defined. The geological units of finer scale are elements of geological units at coarse scale. This consistency should be preserved in the PV models.

In a graphical implementation of PV, both scalability and change in the graphical resolution should be taken into account. The zooming in/out feature of the PV method is depicted in FIG. 9. Each geological scale consists of several graphical resolutions. The model is updated from coarse scale to fine scale both for geological scale and graphical resolution as described above in a series of examples when the PV model is zoomed in for higher resolution and finer geological scale.

Figure 10A:
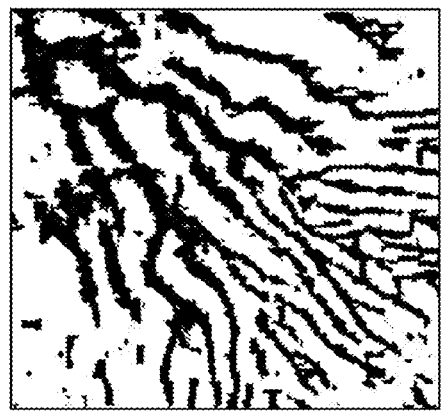
FIGS. 10A-C are diagrams of an illustrative application of PV techniques for object based simulation of the growth of fractures and/or fluvial channels within a reservoir rock formation as a growing network of connected vectors within a PV model.
Figure 10B:
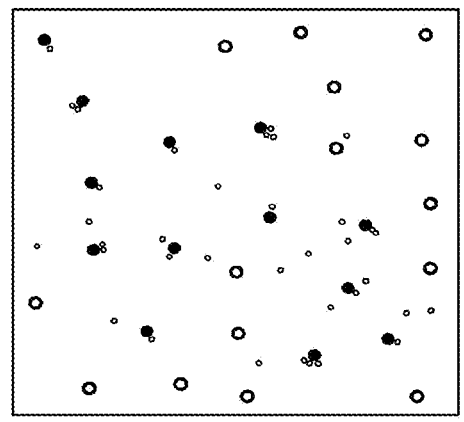
Figure 10C:
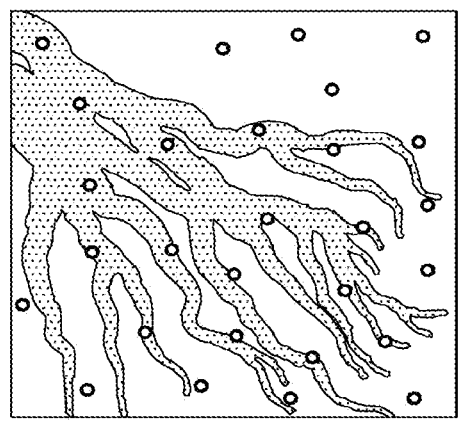

FIGS. 10A-C present how the above-described PV techniques may be used to simulate not only contact boundaries between categories, but geological objects directly in the form of polylines as fluvial channels or fracture network by growing network of connected vectors. The model shown in FIG. 10A may be generated using a multiple-point statistics (MPS) procedure and is provided for comparison purposes. The resulting PV model as shown in FIG. 10C may be generated by updating the PV model as shown in FIG. 1013 using the gridless/PV techniques disclosed herein tend to be more geologically realistic than models generated with conventional geostatistical simulation methods, e.g. with sequential indicator simulation (SIS) or MPS. The simulated geological objects have higher connectivity in PV models in comparison with conventional geostatistical categorical models, as illustrated in FIGS. 10A and 10C.

The geostatistical categories in a petroleum application usually represent lithological facies, which can be deposited in simple stacking pattern called transitional depositional rule or in more complex intrusive way. These facies relationships are possible to model with PV. A 2D example of PV fluvial models generated according to stacking and intrusive patterns is provided. The transitional type of deposition has been described in all examples above. The intrusive type of deposition is stressed out in this example.

Figure 11:
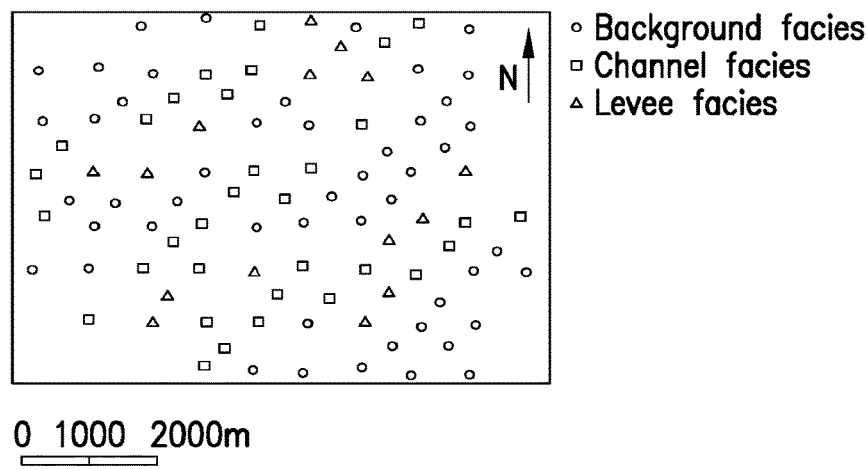
FIG. 11 is a diagram of an illustrative conditioning data set for a 2D facies simulation with transitional facies pattern and intrusive facies pattern.
Figure 12:
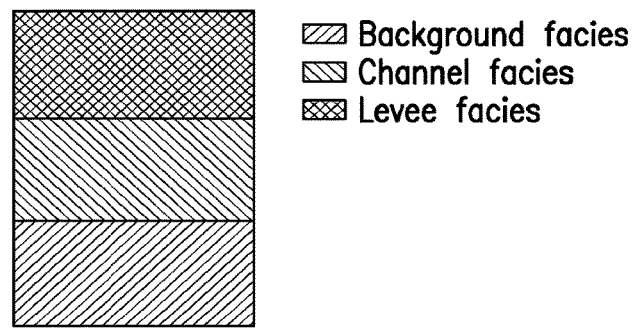
FIG. 12 is a diagram of an illustrative relationship between different types of facies for a transitional facies pattern.
Figure 13:
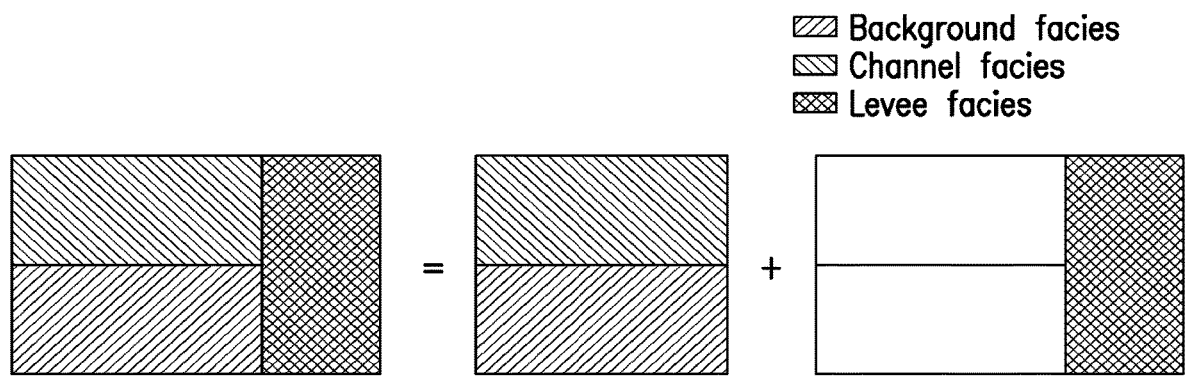
FIG. 13 is a diagram of an illustrative relationship between different types of facies for an intrusive facies pattern.

FIG. 11 is a diagram of an illustrative conditioning data set for different facies types, including a background facies, channel facies, and levee facies. Although only three types of facies are shown in FIG. 11, it should be appreciated that embodiments are not intended to be limited thereto and the PV techniques disclosed herein may be applied to any number of facies types. FIG. 12 illustrates a relationship between the different facies types of FIG. 11 for a transitional facies pattern. FIG. 13 illustrates a relationship between the different facies types for an intrusive facies pattern.

Figure 14A:
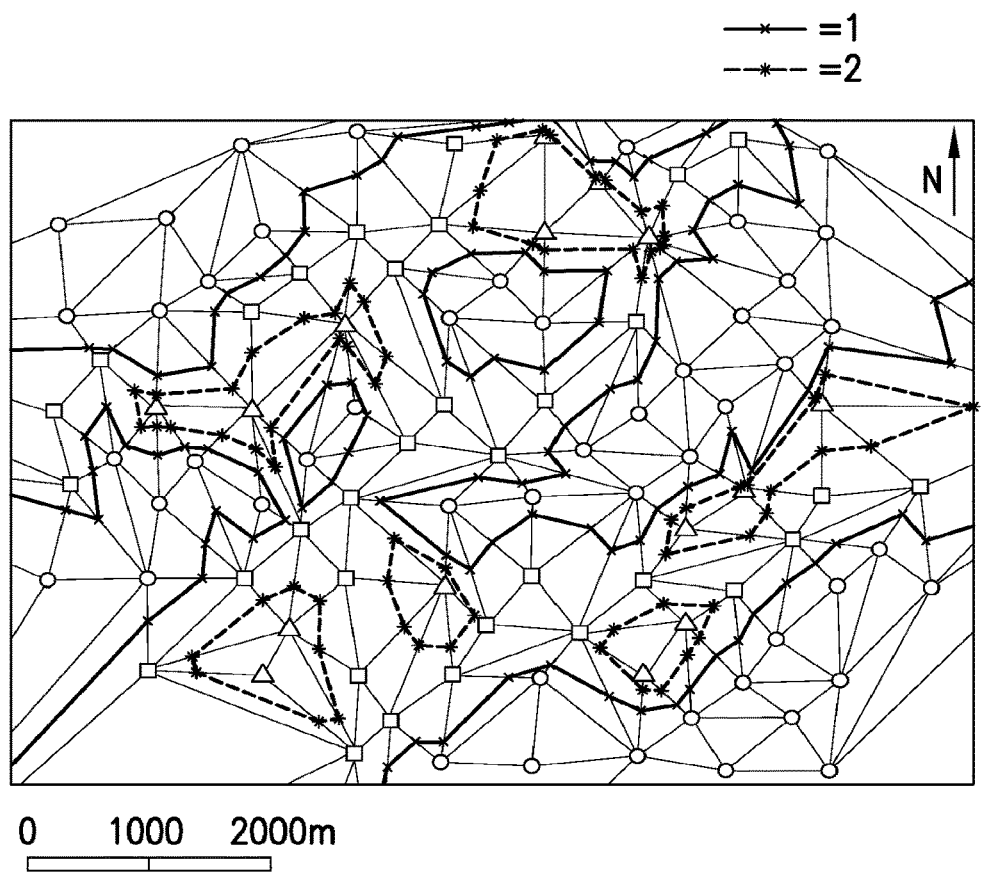
FIGS. 14A-B are different views of coarse directional polylines and the resulting facies model generated from the polylines according to a transitional facies pattern.
Figure 14B:
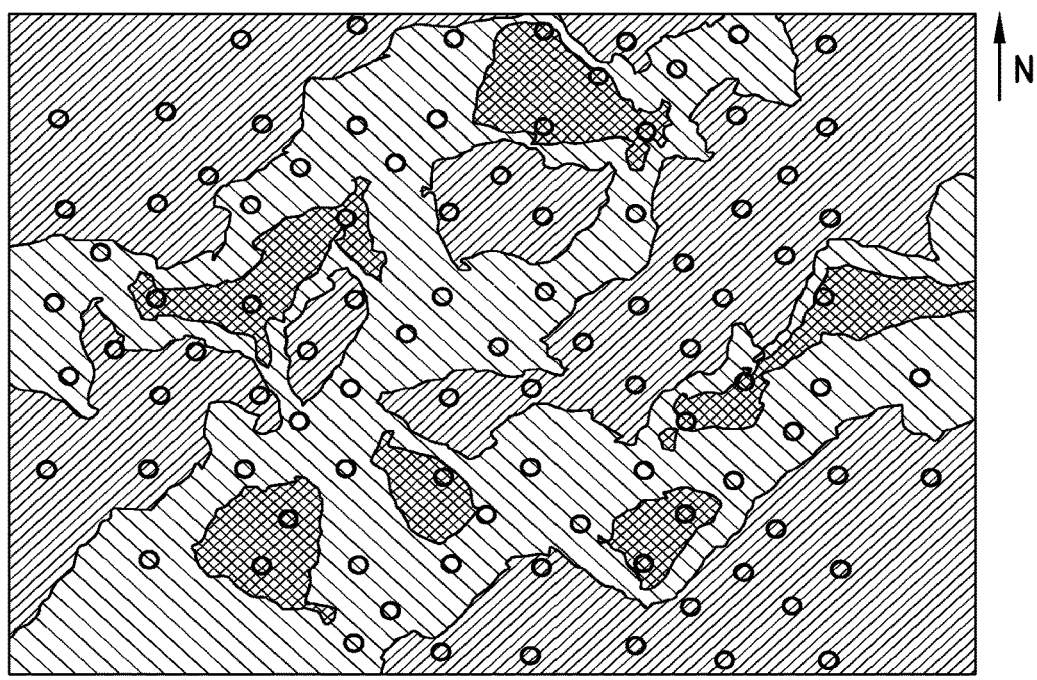

FIGS. 14A-B are different views of coarse directional polylines and the resulting facies model generated from the polylines according to a stacking facies pattern.

Figure 15A:
FIGS. 15A-C are diagrams of intermediate and final facies models generated according to an intrusive facies pattern.
Figure 15B:
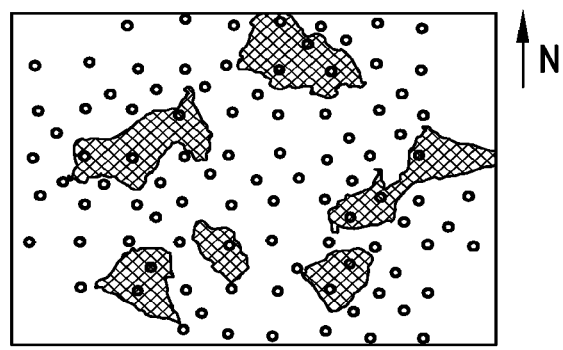
Figure 15C:
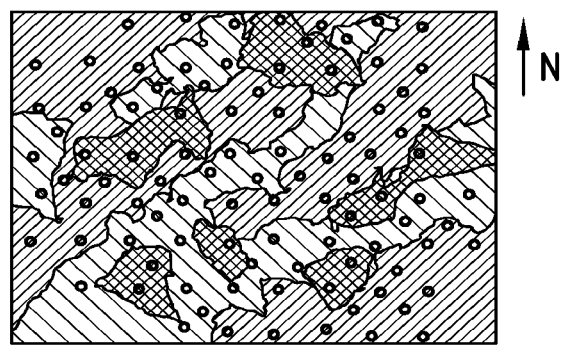

FIGS. 15A-C are diagrams of intermediate and final facies models generated according to an intrusive facies pattern. The final PV models in this example may honor data values and exhibit imposed relationship between lithological facies either in transitional or intrusive forms. The intrusive type depositional environments may be generated as follows: first, categories for modeling are defined and grouped according to their depositional relationship, where, as shown in FIG. 13, facies associations that consist of transitional facies (e.g., background and channel facies) may be defined along with intrusive facies (e.g., levee facies); models for each of the defined facies associations; including a model for the transitional facies and another model for the intrusive facies (as shown in FIGS. 15A and 15B, respectively), are generated based on the disclosed PV simulation procedure or technique; and the two models (the transitional facies model and the intrusive facies model) are merged together into a single PV model (as shown in FIG. 15C).

Figure 16:
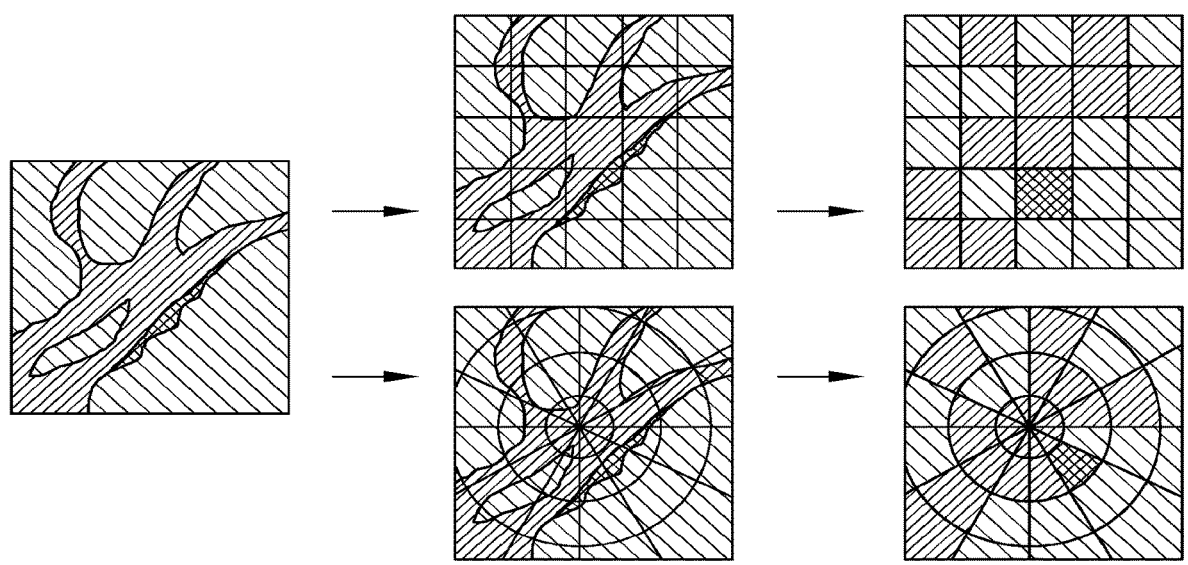
FIG. 16 is a diagram of an illustrative transition of a gridless model to a gridded model having a specified structure.

In one or more embodiments, the generated PV model may be used further for flow simulation and reservoir forecasting. Imposing a grid on the top of the PV model may be relatively straightforward for any arbitrary (regular or irregular) grid structure, as shown in the example of FIG. 16. The inclusion of such a grid may be required for subsequent flow simulation in certain cases. The PV model with strict contact boundaries is averaged over the imposed grid. This process is similar to the upscaling procedure of geological facies, where, for instance, the facies with the largest proportion within the grid cell is assigned to this entire grid cell.

As will be described in further detail below, only slight changes to the above-described PV techniques for generating 2D models may be needed for generating 3D models. For example, the triangulation performed for 2D models may be replaced with tetrahedralization in 3D space. Spline curves may be replaced with spline surfaces to draw contact boundaries between categories in 3D.

Figure 17A:
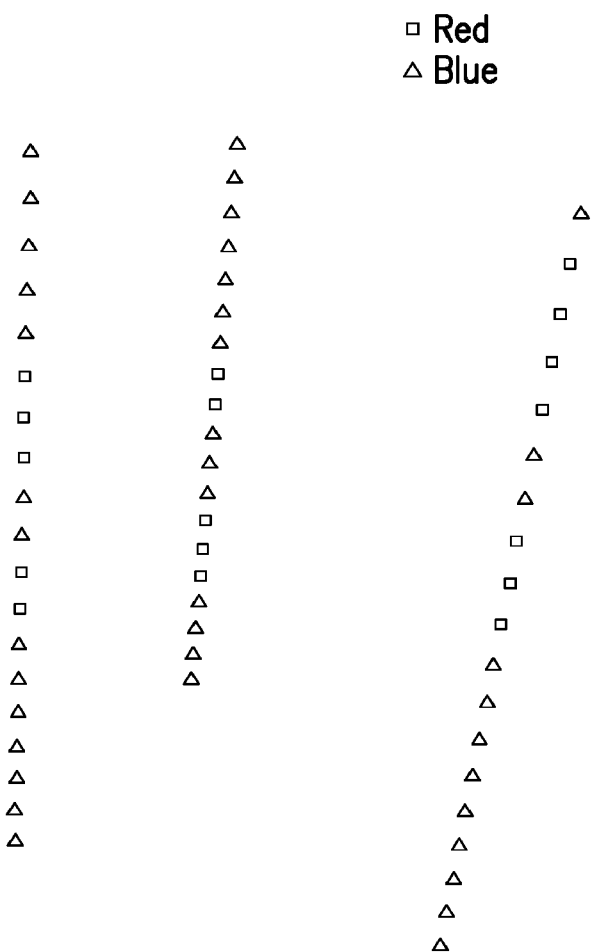
FIGS. 17A-F are different views of control points and splines within an illustrative three-dimensional (3D) vector space at various stages of PV simulation procedure.
Figure 17B:
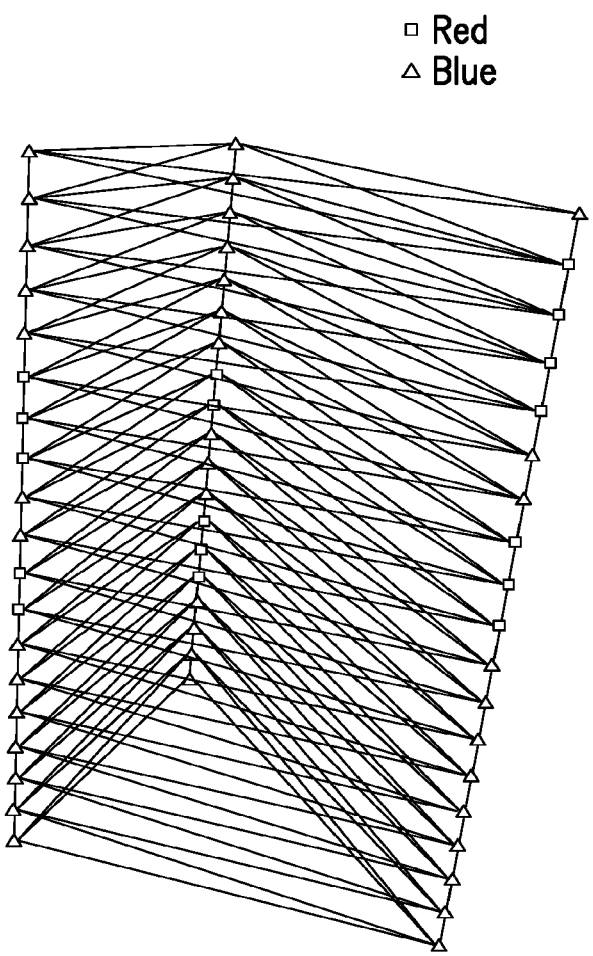
Figure 17C:
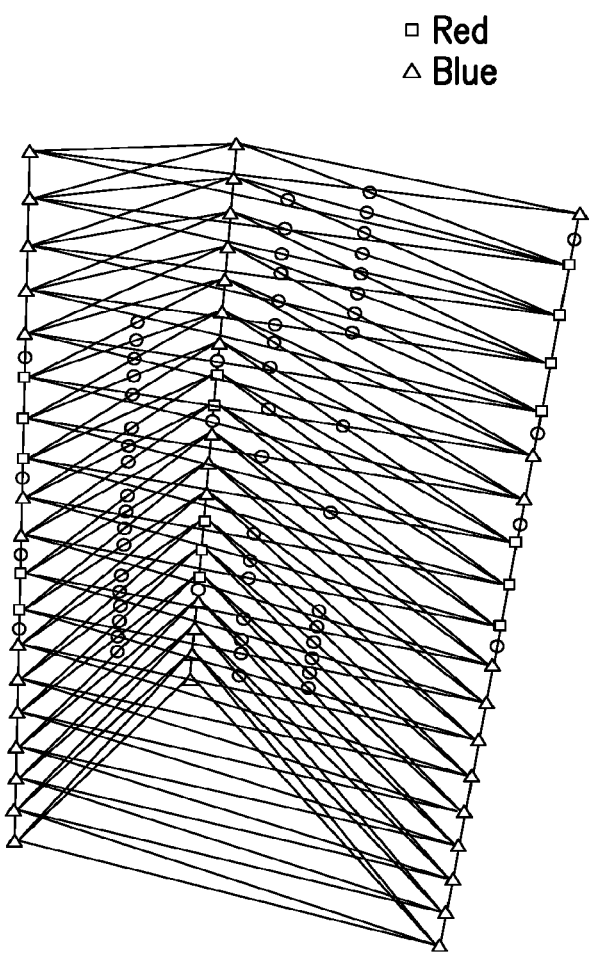
Figure 17D:
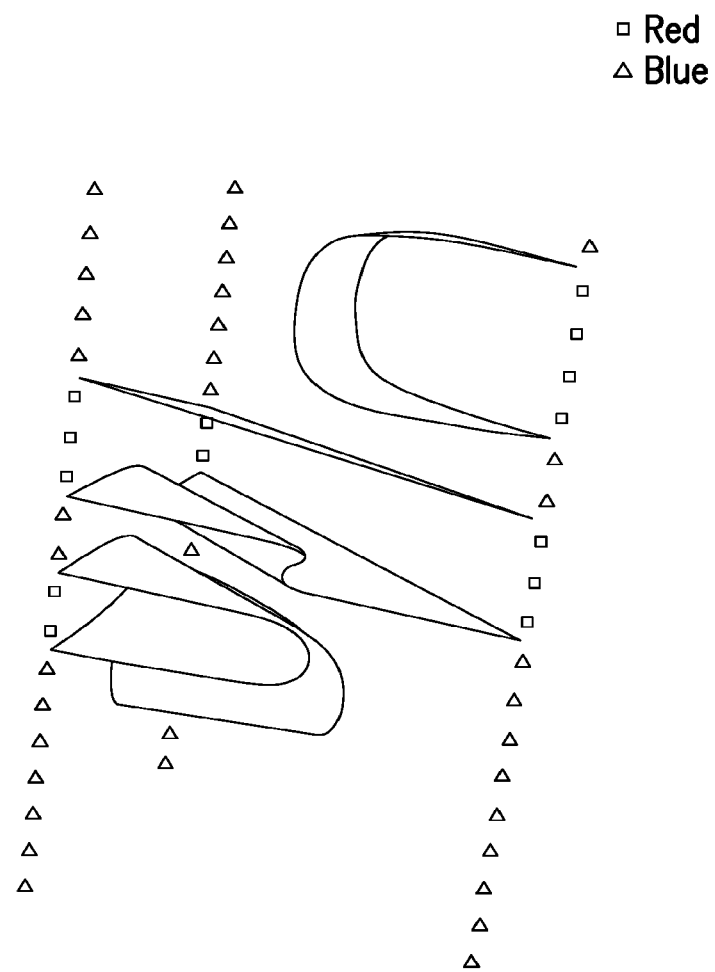
Figure 17E:
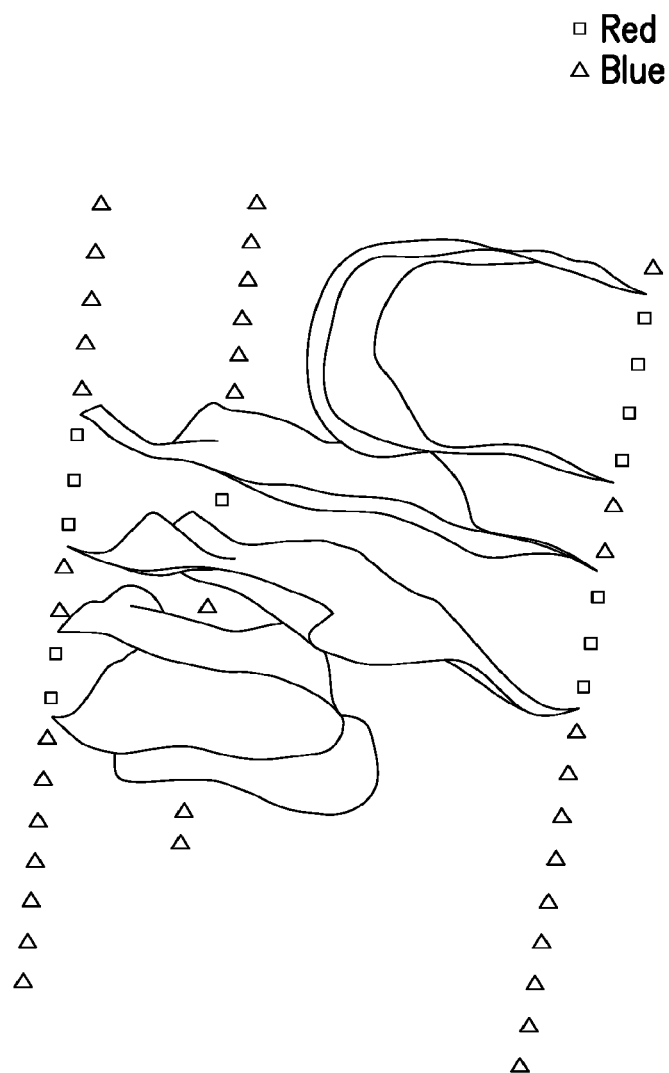
Figure 17F:
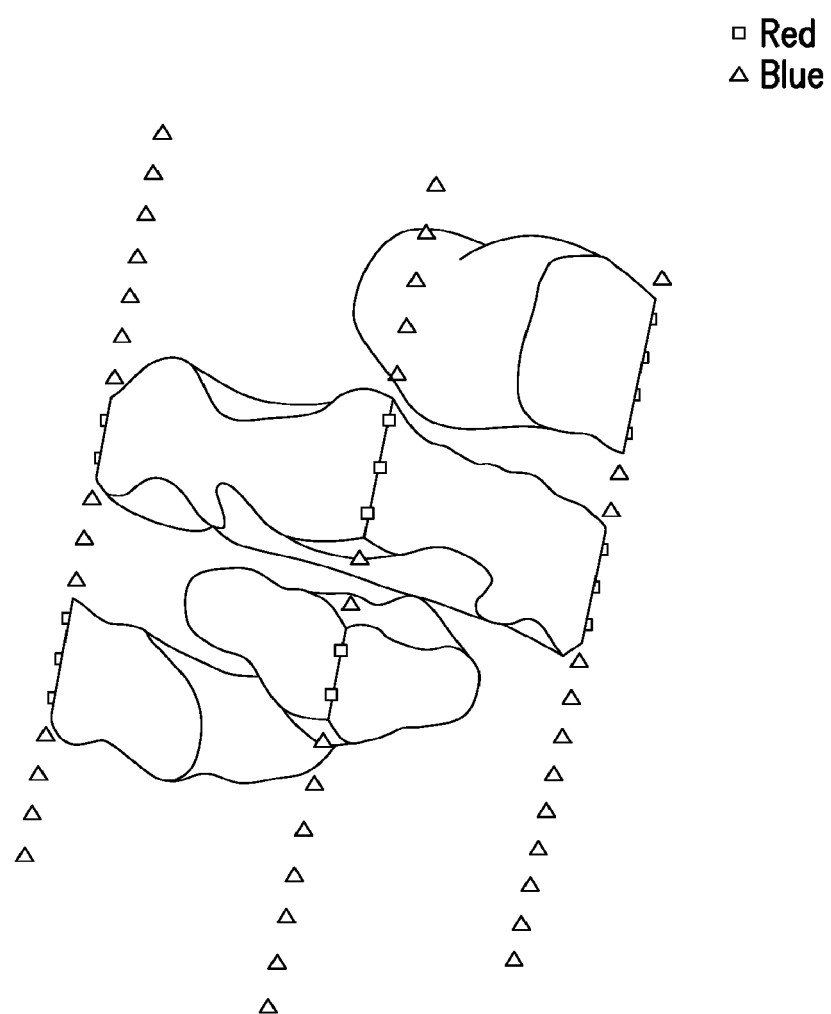
Figure 18A:
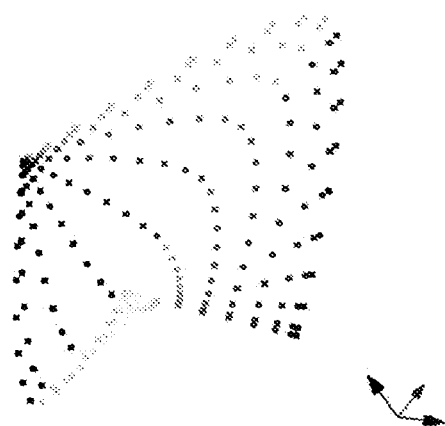
FIGS. 18A-B are different views of an illustrative spline surface at various discretization levels.
Figure 18B:
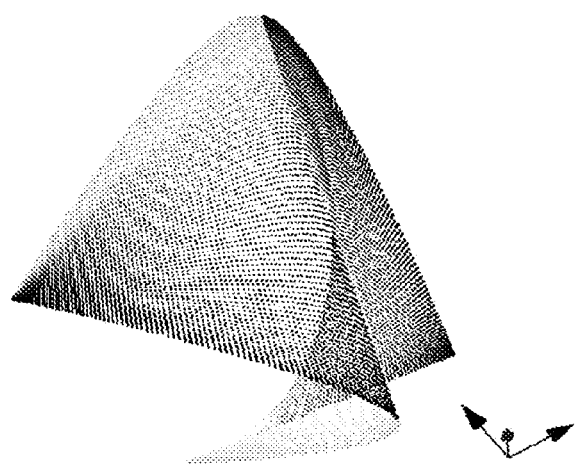

FIGS. 17A-F illustrate a workflow for using the PV techniques to generate a 3D PV model of a reservoir formation. In FIG. 17A, data for the 3D model is defined. In FIG. 17B, tetrahedralization is performed. In FIG. 17C, control points are drawn on the tetrahedron edges that connect data of different values. In FIG. 17D, spline surfaces are generated that go through the control points. In FIGS. 18A and 18B, examples of such a spline surface (e.g., a Hermite spline surface) are shown at different discretization levels, e.g., coarse and fine, respectively. In FIG. 17E, local variability is added to overcome smoothness of the contact boundaries. In FIG. 17F, categorical objects are defined through spline surfaces.

Figure 19:
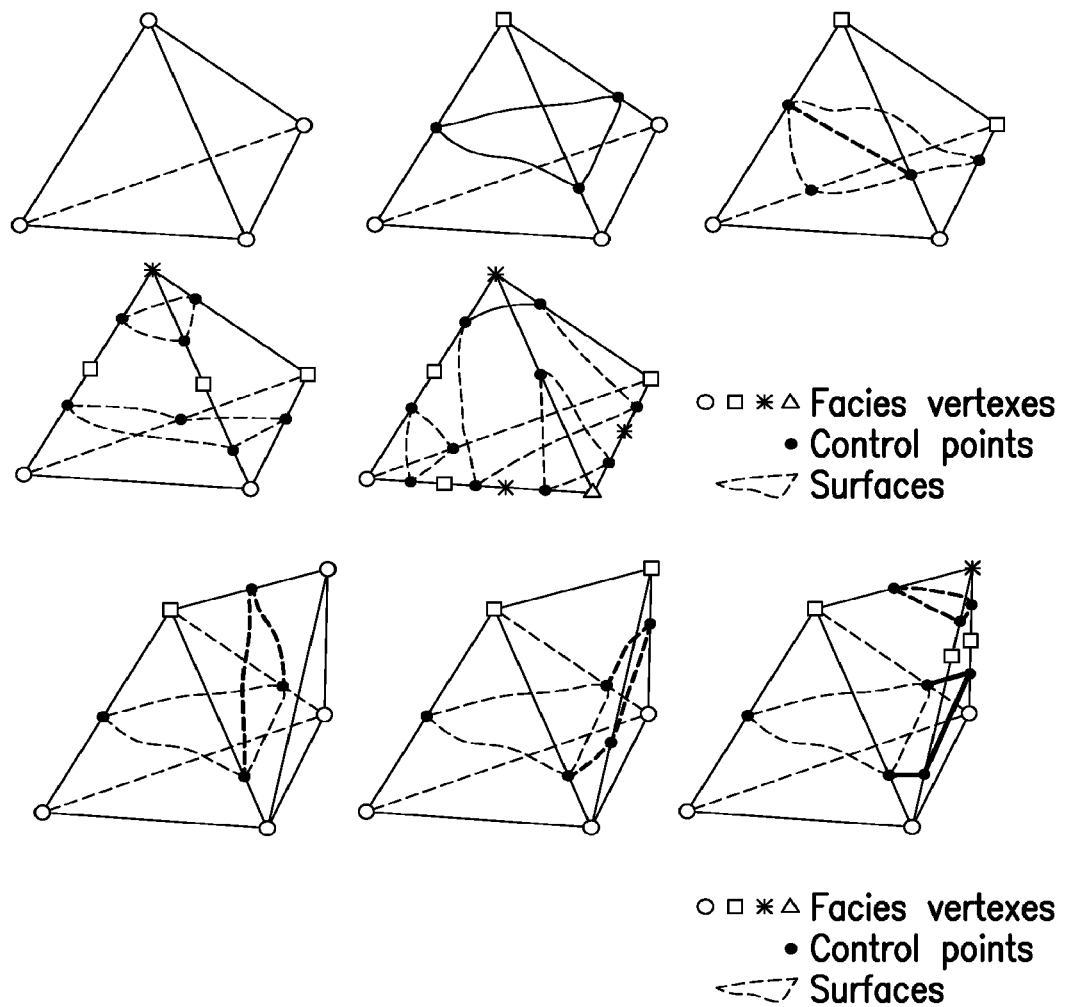
FIG. 19 is a diagram of an illustrative tetrahedralization and placement of control points on the edges of tetrahedrons within a 3D vector space.

FIG. 19 illustrates the placement rule with respect to control points for transitional depositional type of lithological facies. As shown in FIG. 19, control points are placed on the edges of tetrahedrons resulting from a tetrahedralization of data in 3D space.

FIG. 20 is a block diagram illustrating an example of a computer system 2000 in which embodiments of the present disclosure may be implemented. For example, process 300 of FIG. 3, as described above, may be implemented using system 2000. System 2000 can be a computer, phone; personal digital assistant device (PDA), or any other type of electronic device. Such an electronic device includes various types of computer readable media and interfaces for various other types of computer readable media. As shown in FIG. 20, system 2000 includes a permanent storage device 2002, a system memory 2004, an output device interface 2006, a system communications bus 2008, a read-only memory (ROM) 2010, processing unit(s) 2012, an input device interface 2014, and a network interface 2016.

Bus 2008 collectively represents all system, peripheral, and chipset buses that communicatively connect the numerous internal devices of system 2000. For instance, bus 2008 communicatively connects processing unit(s) 2012 with ROM 2010, system memory 2004, and permanent storage device 2002.

From these various memory units, processing unit(s) 2012 retrieves instructions to execute and data to process in order to execute the processes of the subject disclosure. The processing unit(s) can be a single processor or a multi-core processor in different implementations.

ROM 2010 stores static data and instructions that are needed by processing unit(s) 2012 and other modules of system 2000. Permanent storage device 2002, on the other hand, is a read-and-write memory device. This device is a non-volatile memory unit that stores instructions and data even when system 2000 is off. Some implementations of the subject disclosure use a mass-storage device (such as a magnetic or optical disk and its corresponding disk drive) as permanent storage device 2002.

Other implementations use a removable storage device (such as a floppy disk, flash drive, and its corresponding disk drive) as permanent storage device 2002. Like permanent storage device 2002, system memory 2004 is a read-and-write memory device. However, unlike storage device 2002, system memory 2004 is a volatile read-and-write memory, such a random access memory. System memory 2004 stores some of the instructions and data that the processor needs at runtime. In some implementations, the processes of the subject disclosure are stored in system memory 2004, permanent storage device 2002, and/or ROM 2010. For example, the various memory units include instructions for computer aided pipe string design based on existing string designs in accordance with some implementations. From these various memory units, processing unit(s) 2012 retrieves instructions to execute and data to process in order to execute the processes of some implementations.

Bus 2008 also connects to input and output device interfaces 2014 and 2006. Input device interface 2014 enables the user to communicate information and select commands to the system 2000. Input devices used with input device interface 2014 include, for example, alphanumeric, QWERTY, or T9 keyboards, microphones, and pointing devices (also called "cursor control devices"). Output device interfaces 2006 enables, for example, the display of images generated by the system 2000. Output devices used with output device interface 2006 include; for example, printers and display devices; such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including; but not limited to, acoustic, speech, or tactile input. Additionally; interaction with the user may include transmitting and receiving different types of information, e.g., in the form of documents, to and from the user via the above-described interfaces.

Also, as shown in FIG. 20, bus 2008 also couples system 2000 to a public or private network (not shown) or combination of networks through a network interface 2016. Such a network may include, for example, a local area network ("LAN"), such as an Intranet, or a wide area network ("WAN"), such as the Internet. Any or all components of system 2000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media; or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SI) cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 300 of FIG. 3, as described above, may be implemented using system 2000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for modeling petroleum reservoir properties. In one embodiment of the present disclosure, a method of modeling petroleum reservoir properties includes: analyzing data relating to geological properties of a reservoir formation; generating a tiered hierarchy of geological elements within the reservoir formation at different geological scales, based on the analysis; categorizing the geological elements at each of the different geological scales in the tiered hierarchy; defining spatial boundaries between the categorized geological elements for each of the geological scales in the tiered hierarchy; and generating a gridless model of the reservoir formation, based on the spatial boundaries defined for at least one of the geological scales in the tiered hierarchy. In another embodiment of the present disclosure, a computer-readable storage medium having instructions stored therein is disclosed, where the instructions, when executed by a computer, cause the processor to perform a plurality of functions, including functions to: analyze data relating to geological properties of a reservoir formation; generate a tiered hierarchy of geological elements within the reservoir formation at different geological scales, based on the analysis; categorize the geological elements at each of the different geological scales in the tiered hierarchy; define spatial boundaries between the categorized geological elements for each of the geological scales in the tiered hierarchy; and generate a gridless model of the reservoir formation, based on the spatial boundaries defined for at least one of the geological scales in the tiered hierarchy.

One or more embodiments of the foregoing method and/or computer-readable storage medium may further include any one or any combination of the following additional elements, functions or operations: simulating fluid flow within the reservoir formation, based on the gridless model of the reservoir formation; the gridless model may be a two-dimensional (2D) model of the reservoir formation in a vector graphics format and the spatial boundaries between the categorized geological elements may be defined as polylines in 2D space; the gridless model may be a three-dimensional (3D) model of the reservoir formation in a vector graphics format and the spatial boundaries between the categorized geological elements may be defined as spline surfaces in 3D space; the data may be obtained from one or more data sources; the one or more data sources may include one or more of a core sample, a well log, seismic data log, and a geological interpretation. In one or more embodiments of the foregoing method and/or computer-readable storage medium, each of the different geological scales of the gridless model may be associated with a plurality of graphical resolutions at different zoom levels. In one or more embodiments of the foregoing method and/or computer-readable storage medium, the different geological scales may include a basin scale, a depositional scale, and a reservoir scale; and the plurality of graphical resolutions include a range of resolutions varying between a coarse resolution and a fine resolution.

Furthermore, a system is disclosed, where the system includes at least one processor and a memory coupled to the processor having instructions stored therein, which when executed by the processor, cause the processor to perform functions including functions to: analyze data relating to geological properties of a reservoir formation; generate a tiered hierarchy of geological elements within the reservoir formation at different geological scales, based on the analysis; categorize the geological elements at each of the different geological scales in the tiered hierarchy; define spatial boundaries between the categorized geological elements for each of the geological scales in the tiered hierarchy; generate a gridless model of the reservoir formation, based on the spatial boundaries defined for at least one of the geological scales in the tiered hierarchy; and simulate fluid flow within the reservoir formation, based on the gridless model of the reservoir formation.

In one or more embodiments of the foregoing system, the gridless model may be a two-dimensional (2D) model of the reservoir formation in a vector graphics format and the spatial boundaries between the categorized geological elements may be defined as polylines in 2D space. Alternatively, the gridless model may be a three-dimensional (3D) model of the reservoir formation in a vector graphics format; and the spatial boundaries between the categorized geological elements may be defined as spline surfaces in 3D space. Further, the data may be obtained from one or more data sources, where the one or more data sources may include one or more of a core sample, a well log, seismic data log, and a geological interpretation. In one or more embodiments of the foregoing system, each of the different geological scales of the gridless model may be associated with a plurality of graphical resolutions at different zoom levels. In one or more embodiments of the foregoing system, the different geological scales may include a basin scale, a depositional scale, and a reservoir scale, and the plurality of graphical resolutions include a range of resolutions varying between a coarse resolution and a fine resolution.

While specific details about the above embodiments have been described, the above hardware and software descriptions are intended merely as example embodiments and are not intended to limit the structure or implementation of the disclosed embodiments. For instance, although many other internal components of the system 2000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of modeling petroleum reservoir properties, the method comprising:
    analyzing, by a computer system, an initial set of conditioning data relating to geological properties of a reservoir formation;
    generating, by the computer system, a tiered hierarchy of geological elements within the reservoir formation at different geological scales, based on the analysis;
    categorizing, by the computer system, the geological elements at each of the different geological scales in the tiered hierarchy;
    defining, by the computer system, spatial boundaries between the categorized geological elements for a first geological scale selected from the geological scales in the tiered hierarchy, wherein defining the spatial boundaries includes connecting a plurality of data points with one or more vectors;
    generating, by the computer system, a gridless point-vector model of the reservoir formation, based on the spatial boundaries defined for the first geological scale in the tiered hierarchy, wherein the gridless point-vector model is at least one of a two-dimensional (2D) model or a three-dimensional (3D) model of the reservoir formation generated in a vector graphics format with a first set of connected vectors representing contact boundaries between the categorized geological elements at the first geological scale in the tiered hierarchy;
    obtaining, by the computer system, additional conditioning data for modeling the geological properties of the reservoir formation at a second geological scale in the tiered hierarchy;
    adjusting, by the computer system, the spatial boundaries between the categorized geological elements for the second geological scale in the tiered hierarchy, based on the additional conditioning data;
    updating, by the computer system, the gridless point-vector model of the reservoir formation, based on the adjusted spatial boundaries, wherein the updated gridless point-vector model includes a second set of connected vectors representing the contact boundaries between the categorized geological elements at the second geological scale while preserving the first set of connected vectors representing the contact boundaries at the first geological scale;
    estimating, by the computer system, petroleum reserves of the reservoir formation based on the updated gridless point-vector model; and
    performing one or more wellsite operations for the reservoir formation, based on the estimated petroleum reserves.

2. The method of claim 1, further comprising:
    simulating fluid flow within the reservoir formation, based on the gridless point-vector model of the reservoir formation.

3. The method of claim 2, wherein the spatial boundaries between the categorized geological elements are defined as polylines in 2D space.

4. The method of claim 2, wherein the spatial boundaries between the categorized geological elements are defined as spline surfaces in 3D space.

5. The method of claim 1, wherein the initial set of conditioning data is obtained from a first data source in a plurality of data sources, and the additional conditioning data is obtained from a second data source in the plurality of data sources.

6. The method of claim 5, wherein the plurality of data sources include a core sample, a well log, seismic data log, and a geological interpretation.

7. A system for modeling petroleum reservoir properties, the system comprising:
    at least one processor; and a memory coupled to the processor having instructions stored therein, which when executed by the processor, cause the processor to perform functions including functions to:

analyze an initial set of conditioning data relating to geological properties of a reservoir formation;

generate a tiered hierarchy of geological elements within the reservoir formation at different geological scales, based on the analysis;

categorize the geological elements at each of the different geological scales in the tiered hierarchy;

define spatial boundaries between the categorized geological elements for a first geological scale selected from the geological scales in the tiered hierarchy, wherein defining the spatial boundaries includes connecting a plurality of data points with one or more vectors;

generate a gridless point-vector model of the reservoir formation, based on the spatial boundaries defined for the first geological scale in the tiered hierarchy, wherein the gridless point-vector model is at least one of a two-dimensional (2D) model or a three-dimensional (3D) model of the reservoir formation generated in a vector graphics format with a first set of connected vectors representing contact boundaries between the categorized geological elements at the first geological scale in the tiered hierarchy;

obtain additional conditioning data for modeling the geological properties of the reservoir formation at a second geological scale in the tiered hierarchy;

adjust the spatial boundaries between the categorized geological elements for the second geological scale in the tiered hierarchy, based on the additional conditioning data;

update the gridless point-vector model of the reservoir formation, based on the adjusted spatial boundaries, wherein the updated gridless point-vector model includes a second set of connected vectors representing the contact boundaries between the categorized geological elements at the second geological scale while preserving the first set of connected vectors representing the contact boundaries at the first geological scale; and estimate petroleum reserves of the reservoir formation based on the updated gridless point-vector model, wherein one or more wellsite operations for the reservoir formation are performed based on the estimated petroleum reserves.

8. The system of claim 7, wherein the functions performed by the processor further include functions to:

simulate fluid flow within the reservoir formation, based on the gridless point-vector model of the reservoir formation.

9. The system of claim 8, wherein the spatial boundaries between the categorized geological elements are defined as polylines in 2D space.

10. The system of claim 8, wherein the spatial boundaries between the categorized geological elements are defined as spline surfaces in 3D space.

11. The system of claim 7, wherein the initial set of conditioning data is obtained from a first data source in a plurality of data sources, and the additional conditioning data is obtained from a second data source in the plurality of data sources.

12. The system of claim 11, wherein the plurality of data sources include a core sample, a well log, seismic data log, and a geological interpretation.

13. A computer-readable storage medium having instructions stored therein, which when executed by a computer cause the computer to perform a plurality of functions, including functions to:

analyze an initial set of conditioning data relating to geological properties of a reservoir formation;

generate a tiered hierarchy of geological elements within the reservoir formation at different geological scales, based on the analysis;

categorize the geological elements at each of the different geological scales in the tiered hierarchy;

define spatial boundaries between the categorized geological elements for a first geological scale selected from the geological scales in the tiered hierarchy, wherein defining the spatial boundaries includes connecting a plurality of data points with one or more vectors;

generate a gridless point-vector model of the reservoir formation, based on the spatial boundaries defined for the first geological scale in the tiered hierarchy, wherein the gridless point-vector model is at least one of a two-dimensional (2D) model or a three-dimensional (3D) model of the reservoir formation generated in a vector graphics format with a first set of connected vectors representing contact boundaries between the categorized geological elements at the first geological scale in the tiered hierarchy;

obtain additional conditioning data for modeling the geological properties of the reservoir formation at a second geological scale in the tiered hierarchy;

adjust the spatial boundaries between the categorized geological elements for the second geological scale in the tiered hierarchy, based on the additional conditioning data;

update the gridless point-vector model of the reservoir formation, based on the adjusted spatial boundaries, wherein the updated gridless point-vector model includes a second set of connected vectors representing the contact boundaries between the categorized geological elements at the second geological scale while preserving the first set of connected vectors representing the contact boundaries at the first geological scale; and estimate petroleum reserves of the reservoir formation based on the updated gridless point-vector model, wherein one or more wellsite operations for the reservoir formation are performed based on the estimated petroleum reserves.

14. The computer-readable storage medium of claim 13, wherein the functions performed by the computer further include functions to:

simulate fluid flow within the reservoir formation, based on the gridless point-vector model of the reservoir formation.

15. The computer-readable storage medium of claim 14, wherein the spatial boundaries between the categorized geological elements are defined as polylines in 2D space.

16. The computer-readable storage medium of claim 14, wherein the spatial boundaries between the categorized geological elements are defined as spline surfaces in 3D space.

17. The computer-readable storage medium of claim 13, wherein the initial set of conditioning data is obtained from a first data source in a plurality of data sources, and the additional conditioning data is obtained from a second data source in the plurality of data sources.

18. The computer-readable storage medium of claim 17, wherein the plurality of data sources include a core sample, a well log, seismic data log, and a geological interpretation.

19. The computer-readable storage medium of claim 13, wherein each of the different geological scales of the gridless point-vector model are associated with a plurality of graphical resolutions at different zoom levels.

20. The computer-readable storage medium of claim 19, wherein the different geological scales include a basin scale, a depositional scale, and a reservoir scale, and the plurality of graphical resolutions include a range of resolutions varying between a coarse resolution and a fine resolution.

\* \* \* \* \*